United States Patent
Bernklau-Halvor

(10) Patent No.: US 6,782,495 B2
(45) Date of Patent: Aug. 24, 2004

(54) METHOD FOR ANALYZING PRINTER FAULTS

(75) Inventor: David I. Bernklau-Halvor, Portland, OR (US)

(73) Assignee: Xerox Corporation, Stamford, CT (US)

( * ) Notice: Subject to any disclaimer, the term of this patent is extended or adjusted under 35 U.S.C. 154(b) by 529 days.

(21) Appl. No.: 09/886,453

(22) Filed: Jun. 19, 2001

(65) Prior Publication Data

US 2003/0110413 A1 Jun. 12, 2003

(51) Int. Cl.[7] ................................................ G06F 11/00
(52) U.S. Cl. ........................................... 714/44; 714/33
(58) Field of Search ............................. 714/33, 37, 44, 714/46, 57

(56) References Cited

U.S. PATENT DOCUMENTS

| | | | | |
|---|---|---|---|---|
| 4,866,635 A | * | 9/1989 | Kahn et al. ................... 706/46 |
| 5,463,768 A | * | 10/1995 | Cuddihy et al. ............... 714/37 |
| 5,768,495 A | | 6/1998 | Campbell et al. ........ 395/183.01 |
| 6,363,384 B1 | * | 3/2002 | Cookmeyer et al. ........... 707/10 |
| 6,529,954 B1 | * | 3/2003 | Cookmeyer et al. ......... 709/224 |
| 6,636,771 B1 | * | 10/2003 | Varma et al. ................. 700/79 |
| 6,665,819 B1 | * | 12/2003 | Gopalan et al. ............... 714/37 |
| 6,681,344 B1 | * | 1/2004 | Andrew ....................... 714/38 |
| 2002/0194536 A1 | | 12/2002 | Bernklau-Halvor .......... 714/25 |
| 2003/0110412 A1 | | 6/2003 | Neville ........................ 714/25 |
| 2003/0110413 A1 | * | 6/2003 | Bernklau-Halvor .......... 714/25 |

* cited by examiner

*Primary Examiner*—Robert Beausoliel
*Assistant Examiner*—Bryce P. Bonzo
(74) *Attorney, Agent, or Firm*—Jeannette M. Walder

(57) ABSTRACT

A method of diagnosing a printer problem includes correlating a wide range of printer data types with suggested solutions. Printer diagnostic data, which may include usage information and printer status information collected over a period of time, is parsed into individual components. The components are then input into a set of rules. Each rule compares each component with a corresponding reference value to generate a comparison result, correlates the comparison result with a set of actions including solutions, and if there is a correlation between the comparison result and a solution, providing the solution.

11 Claims, 7 Drawing Sheets

METHOD FOR ANALYZING PRINTER FAULTS

FIELD OF THE INVENTION

This invention relates generally to a method of analyzing printer faults, and more particularly to a method of analyzing printer diagnostic and usage information in order to suggest solutions automatically.

BACKGROUND OF THE INVENTION

When a user has a problem with a printer, typically the user will first attempt to ascertain and fix the problem using whatever built-in diagnosis tools were provided with the printer, if any. For some printers the built-in diagnostic tools may be in the form of a user manual or diagrams on the user interface showing possible locations of printer jams and out-of-supply notices. For printers linked to a personal computer, the install disk of the printer may include diagnostics in the form of a utility program to be run on the user's personal computer. Utility programs may offer suggestions for relatively minor problems, such as cleaning inkjets to improve print quality or how to ascertain a printer jam. When the local diagnostic aids are insufficient to solve the user's printing problem, the user is faced with the decision of taking the printer to a service center (which usually only occurs if the printer is small enough for the user to transport) or requesting a service call from a service technician.

Diagnosing and fixing problems in larger, more complex printers in the field of necessity requires a telephone call to the service center or call center. Depending on the protocol at the particular service center, a product support representative will log in the user's printer complaint, issue a Request ID (RID) to identify the service request and then attempt to solve the problem over the phone. To attempt to solve the problem over the phone, the support representative will make suggestions to the user, which the user will perform on the printer and report back the result, if any. If the problem is resolved, the service call is closed. Otherwise, the service call goes through an escalation process. This may include transferring the call to a different service representative (who may be more skilled or skilled in different problem area) who asks different questions and makes different suggestions. If the escalated phone process is not successful, a field technician is dispatched. While all human-assisted calls, not including the cost of maintaining a service staff at a particular staffing level, are more expensive than automated response systems, dispatching a field technician to the printer is the most expensive.

With the advent of the internet, many companies have established web sites to market their products, enable users to download upgrades to various software products and drivers and provide online service. Some computer manufacturers offer a special technical service software package which a user downloads to his/her computer, enabling the user to connect directly to the computer manufacturer service site for support. Compaq, for example, has a dial-up remote diagnostic system for personal computer customers. Hewlett Packard offers a service called "Instant Support", primarily intended for personal computers, which enables users to automatically check their system for components, search for answers that match a system configuration, connect to a support specialist, send a detailed report to a support specialist and ask questions. This type of support is reportedly being extended to the printer industry in that Hewlett Packard offers an automated Web-based diagnostic and resolution support service for embedded Web server-enabled (EWS) printers, which is intended to help users anticipate, address and resolve printer-specific problems. The intent of such systems is aimed at facilitating the use of phone support as an alternative to on-site service.

While improved use of phone support is helpful to users and reduces costs to manufacturers, there is a need for a remote diagnostic system and method which minimizes or does not require human intervention.

SUMMARY OF THE INVENTION

A support system for diagnosing printer problems, according to the invention, includes a support server a rules engine for parsing printer diagnostic data into components, for analyzing the components and for generating a suggested solution based on combinations of printer diagnostic data and error conditions; and at least one printer, located remote from the support server, and which includes a printer driver. When a user encounters a printer problem, the user selects the printer driver, which sends a request for support to the support server. The rules engine needs printer diagnostic data in order to suggest a solution. Printer diagnostic data may be obtained by one or a combination of methods. The support server may cause a printer diagnostics utility to be sent to the printer. The printer runs the printer diagnostics utility which generates a set of printer diagnostic data and transmits the data to the support server. An advantage of using downloaded printer diagnostics utilities is that the utility can be updated from time to time to retrieve or generate different types of data. If the printer includes a utility which generates and stores printer usage information and printer status information during operation of the printer, that information may be transmitted to the support server instead of the printer diagnostic data generated by the printer diagnostics utility or in addition to the printer diagnostic data. Indeed, printer diagnostic data may include any data stored in the printer memory.

The rules engine then parses the printer diagnostic data into components and analyzes the components in order to determine a cause for the printer problem. The rules engine then determines a suggested solution set for the problem and transmits the suggested solution to the printer. The suggested solution set is typically determined from a database of solutions based on printer diagnostic data and error conditions.

In one particular embodiment, the printer is coupled to a computer having a web browser for connecting to the Internet and the printer contains a usage utility and an embedded web server. The user requests support by accessing the printer driver (which will contain a link for support). The printer driver invokes the user's default browser with a URL argument. The URL is the IP address of the printer (e.g. http://H13.62.154.233/xerox upr tech post) and the web server displays a web page in the web browser. The printer's web server calls postscript functions which extract diagnostic data (generated from the usage utility resident on the printer) and package them in an HTML form variable. Immediately after the page loads in the user's browser, it automatically submits the HTML form via HTTP to the support server. The support server calls the rules engine, the rules engine parses and returns a record set of solution links. The support server constructs a web page and returns it to the user's browser.

The system may also store historical information such as a record of the service request, the printer diagnostic data, and the suggested solution at the support server. Warranty information may be stored in the support server and the warranty entitlement information may be checked at the time of the initial request. Any stored historical information may be provided to the user along with the suggested solution to the current problem. Thus the user sees a very simple, elegant interface with all the complex data interactions done behind the scenes. All of the information sent to the support server is collected without requiring the user to perform any diagnostic tests directly or to answer questions or to interact with the support server or a service technician.

In the event the suggested solution does not fix the printer problem, the user can access a phone support system. The phone support system can access all printer diagnostic data received at the support server during the automated process and use that data to facilitate telephone support or for a service representative call.

The system may be used on any network, whether intranet or extranet (e.g., the Internet), although it is expected that most users would contact the support server over the Internet. The printer driver may include a web browser for pointing to a web page at the support server.

A method of diagnosing a printer problem, includes providing printer diagnostic data, wherein printer diagnostic data comprises data pertaining to operation of a printer at a time of a printer fault; parsing the printer diagnostic data into components; executing a rule comprising: comparing each component with a corresponding reference value to generate a comparison result; and correlating the comparison result with a set of actions including solutions; wherein, if there is a correlation between the comparison result and a solution, providing the solution. The correlating step may further includes the steps of: determining if the comparison is true, wherein if the comparison is true, the set of actions includes going to a next statement in the rule, going to a next rule, going to a specific solution and storing a variable if the comparing step was to identify a data location; and determining if the comparison is false, wherein if the comparison is false, the set of actions include going to a next statement, going to a next rule and going to a specific solution.

The system and method of the invention offer many advantages. For example, the system enables use of printer generated status data to enable a diagnosis, as opposed to customer entered information alone. A centralized support server implementing a rules engine enables the support center to have the latest diagnostics utilities as well as the latest solutions to errors. Use of the Internet as a medium to allow data transfers to take place enables a large number of users to communicate quickly and efficiently with the support server. If the printer includes software for collecting usage profile information, including supplies usage information, and printer status information, such information can also be transmitted to the support server for use in analysis by the rules engine. The system and method of the invention automates the service call handling process and reduces the cost of support while also allowing a 24-hr/day by 7 days/week support coverage for the customer.

DETAILED DESCRIPTION OF THE PREFERRED EMBODIMENTS

Figure 1:
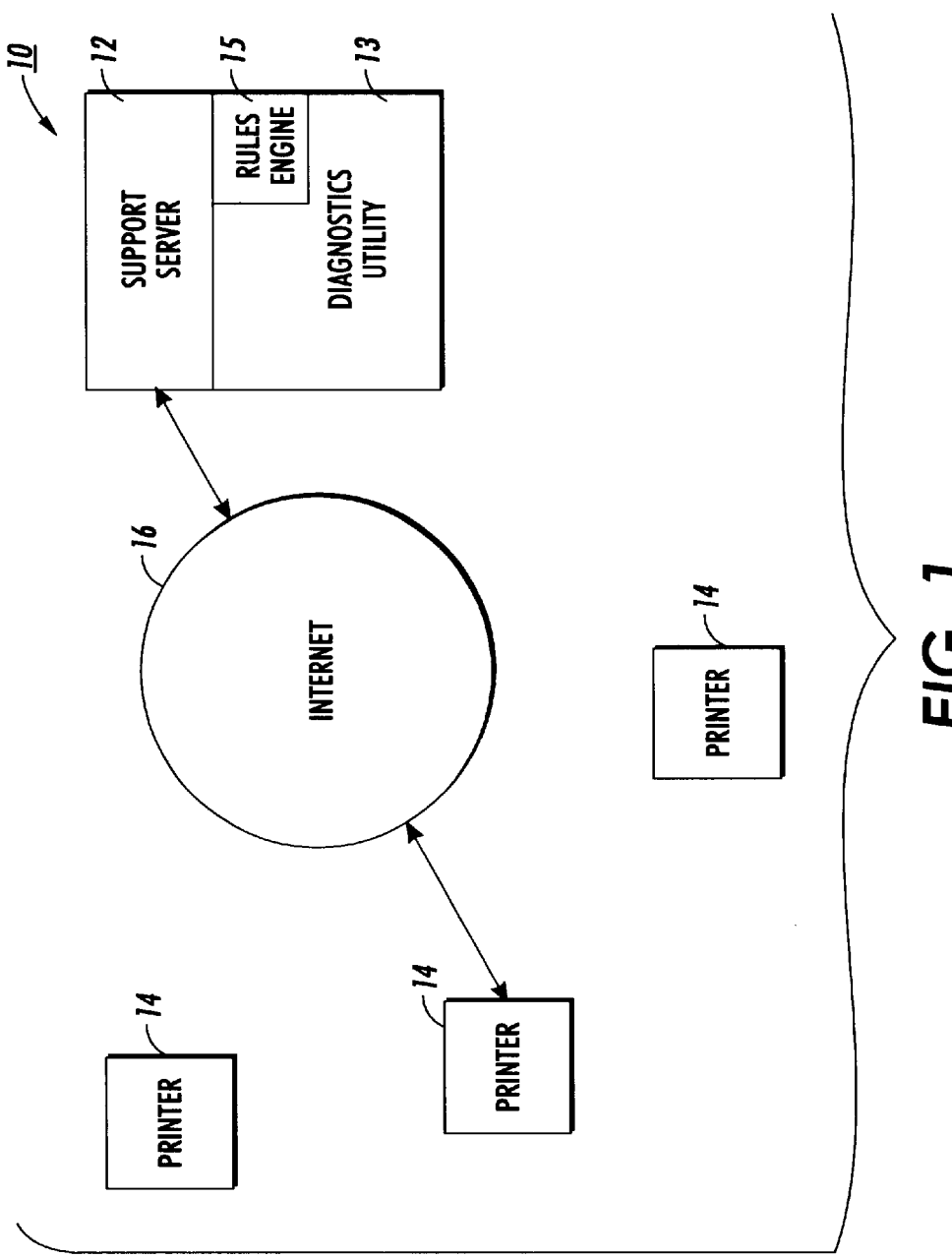
FIG. 1 is a block diagram of a support system for diagnosing printer problems.

Referring to FIG. 1, a system for providing support 10 includes a support server 12 and one or more printers 14, located remote from the support server 12. Communication between support server 12 and printer 14 is made via the Internet 16, or such other communications channel as may be available. The Internet is particularly useful because it provides a ubiquitous connection for large numbers of individuals and businesses.

Figure 2:
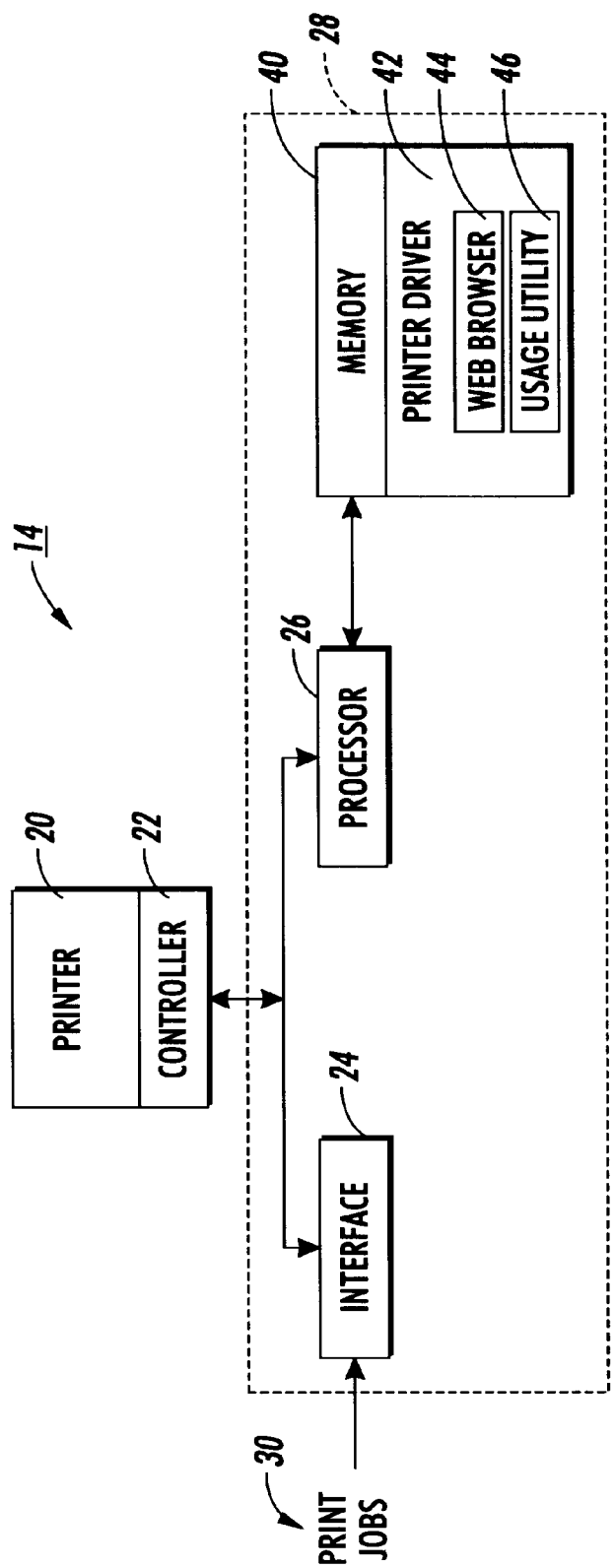
FIG. 2 is a block diagram of a printer shown in FIG. 1.
Figure 3:
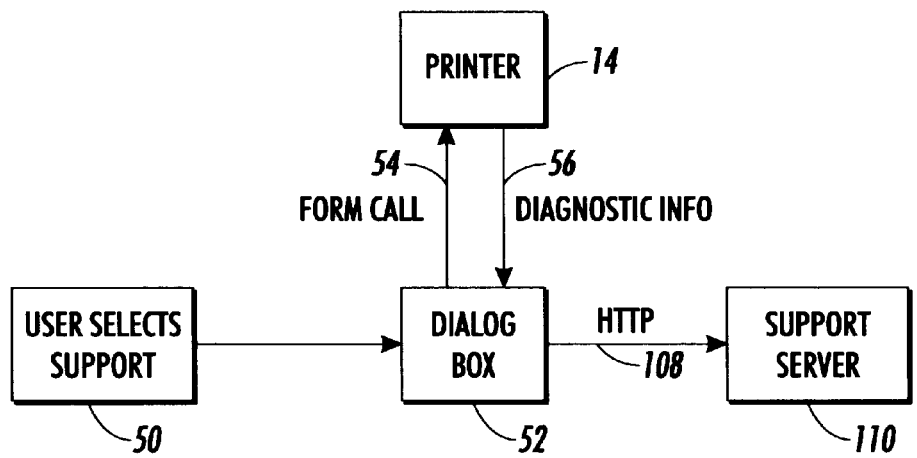
FIG. 3 is a block diagram illustrating the architecture for a service request in the support system.

A typical printer 14 is shown in FIG. 2. Printer 14 includes printer hardware 20 for receiving a print medium, transferring ink or toner in the form of an image onto the print medium and exiting the printed print medium. Printer controller 22 controls operation of the printer hardware. The functions contained with box 28 may be located within the printer 14 (in the case of larger or production type printers), or they may be located on an external computer, such as a personal computer or a network server to which the printer is connected (in the case of smaller or simpler printers). Functions 28 include a user interface 24 for receiving a print job 30, processor 26 and memory 40. Processor 26 executes the printer driver 42 stored in memory 40. After the print job 30 is interpreted by processor 26 and stored as yellow, cyan, magenta and/or black image data in memory 40, printer controller 22 causes the printer 20 to feed a print medium from a media tray (not shown) and be processed through the printer 20 such that a full color and/or black and white image is transferred onto the print medium, which is then fed by means of an exit path from the printer.

To communicate with support server 12 via the Internet, printer driver 42 may include a web browser 44. Alternatively, the printer driver 42 may communicate through a web browser located on the computer or network to which the printer 14 is connected. Printer 14 may optionally include a usage utility 46. The usage utility 46 gathers various usage information and printer status information during operation of the printer 14 and stores a record of it, usually called a usage profile or usage profile information, in the memory 40. As described later, when a request for service is made to the supply server 12, the support server will request any usage profile information stored about the printer be sent to it for analysis. Alternatively, the printer may send the usage profile information with the request for support.

To aid in the diagnosis of a printer problem or if the printer does not contain a usage profile utility for generating usage profile information, the support server 12 may send a printer diagnostic utility 13 to the printer 14. On receipt the printer 14 runs the diagnostic utility 13 and generates a set of printer diagnostic data which is sent to the support server 12 for analysis. Of course, a printer with a usage utility and stored usage profile information may also download and run the printer diagnostic utility. All data received from the printer 14 by the support server 12 will be parsed and analyzed by the rules engine 15 and a suggested solution generated and transmitted back to the printer 14. Any other data stored in the printer memory 40 may also be sent to the support server for analysis by the rules engine.

A more detailed example of a printer diagnostic system and method will be described with respect to a system and method to be used with Xerox solid ink printers called PhaserSMART. PhaserSMART is a web-based application that analyses information from a user's printer and returns web-based, self-support solutions to the user. In addition to providing printer information analysis, PhaserSMART can be used to combine other systems such as infoSMART (an interactive online support module) and OpenUPTIME (a worldwide customer management system which maintains inventory and manufacturing data). PhaserSMART, for purposes of this example, is used with printers that have a Usage Profile utility resident in the printer firmware. The Usage Profile utility gathers usage information and printer status information during operation of the printer and stores it in a local memory.

Figure 8:
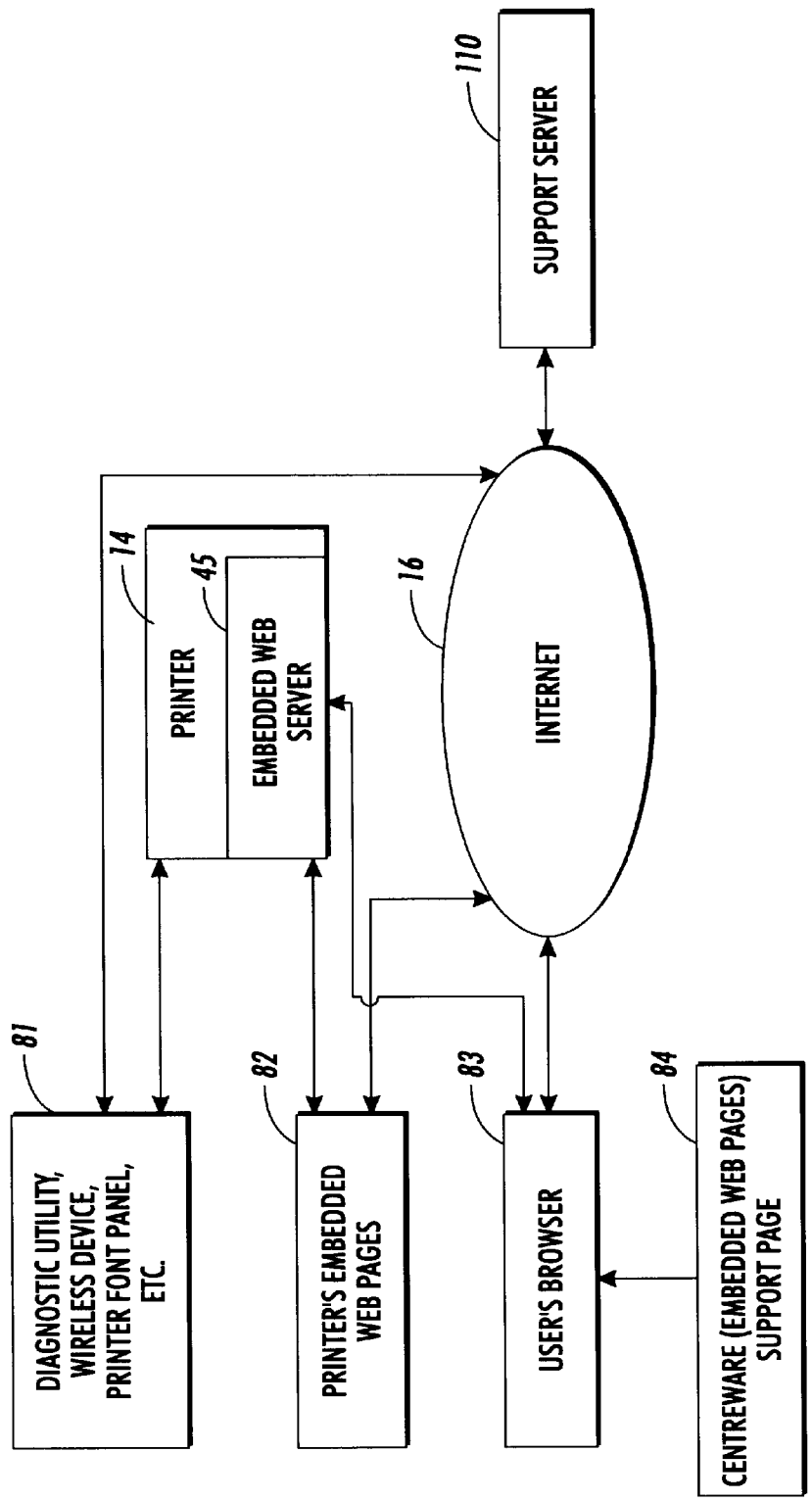
FIG. 8 is a block diagram illustrating several ways of communication between the printer and the support server.

A block diagram of the architecture of the PhaserSMART system is shown in FIGS. 3, 4, 5 and 8. Several methods of accessing the printer 14 in order to request support from support server 110 are shown in FIG. 8. First, the printer 14 may be connected to a personal computer, wireless telephone, personal digital assistant or any device that can accept an IP address. Typically, this means that the device 81 (including the printer itself through a front panel input device) includes a memory and processor running a web browser or application for communicating over the Internet.

In this embodiment, the user accesses printer 14 through a personal computer with a web browser. PhaserSMART presents all information to the user via a web browser 83, which may be any available web browser such as Netscape 4.x and IE 4.x or greater browsers or other such browsers that are JavaScript 1.1 compatible, and support standard frames, tables, and other common HTML elements. The web browser 83 used should have cookies enabled and the web-based user interface may be 640 pixels wide by 480 pixels high, excluding the browser window. The web browser 83 provides exclusive navigation for the user in this embodiment. The user would open the printer driver application on his personal computer 50 and select technical support link on the troubleshooting tab. This action causes a dialog box 52 to be displayed for the user. A form call 54 is made to the printer 14, which directs that any stored usage profile information 56 be sent to the support server 110. Usage profile information 56 (in the form of a single field, Updata) is appended to a support request 108 in the form of an HTTP post which is sent via the Internet to support server 110. Updata contains Usage Profile information generated by the usage profile utility resident on the printer.

Alternatively, in the case where the printer 14 includes an embedded web server 45, when the user opens the printer driver application on his personal computer 50 and select s technical support link on the troubleshooting tab, this action causes the user's web browser 45 to display, invoking a form call 54 to the printer's embedded web server 45, which returns a web page 82 with an HTML form to be sent to the support server 110. Usage profile information 56 (in the form of a single field, Updata) comprises the support request 108 in the form of an HTTP post which is sent via the Internet to support server 110. This form is automatically submitted when the user's browser loads the web page 82 returned by the printer's embedded web server. Updata contains Usage Profile information generated by the usage profile utility resident on the printer. An alternative web page generated by the printer's embedded web server is the CenterWare Support page 84 which is displayed in the user's browser 83.

Table 1 shows a sample usage profile record that might be collected for a particular user's printer.

Sample Usage Profile Record

1=Date of Report=Thu Nov 16 17:43:47 2000;
2=Activation Date=Mon Oct 23 23:25:59 2000;
3=Printer IDs=Serial #:BCLP356, Ethernet:08:00:11:0F:01:33, IP:13.62.70.236, —:xxxxxx;
4=Printer Name=Steffen's_BC;
5=Printer Type=Model:Phaser 860DP, Printer Class:Solid Ink;
6=Adobe Firmware=3010.108 (11);
7=Xerox Firmware=VxWorks:3.18, Engine:14.20, PostScript:14.18, Network:12.48.10.18.2000;
8=Installed RAM (MBs)=128;
9=Installed Trays (incl. Manual)=3;
10=Accessories=Duplexer, , ,;
11=Current Media=Upper Tray:Transparency-Letter, Middle Tray:—, Lower Tray:Paper-Letter, Manual Feed:Other-Other;
101=Report Intervals=Pages:1000, Hours:168;
111=Total Pages & Sheets=Pages:980, Sheets:924;
112=Total Pixels Printed (1K)=Cyan:889005, Magenta:1089088, Yellow:475571, Black:1029656;
113=Average Coverage (%)=Cyan:6, Magenta:7, Yellow:3, Black:8;
114=Coverage-Last 1000 Pages (%)=Cyan:6, Magenta:7, Yellow:3, Black:8;
115=Ink Consumed (Sticks)=Cyan:0.90481, Magenta:1.08198, Yellow:0.50879, Black:1.15476;
116=Pixels Printed Cyan (1K)=Fast Color:10453, Standard:588447, Enhanced:2436, High-Resolution/Photo:287669;
117=Pixels Printed Magenta (1K)=Fast Color:13880, Standard:651569, Enhanced:3615, High-Resolution/Photo:420024;
118=Pixels Printed Yellow (1K)=Fast Color:10831, Standard:371417, Enhanced:2694, High-Resolution/Photo:90629;
119=Pixels Printed Black (1K)=Fast Color:22223, Standard:944578, Enhanced:2454, High-Resolution/Photo:60401;
121=Paper vs. Transparency (pages)=Paper:939, Transparency:41, Other:0;
122=Pixels Printed-Paper (1K)=Cyan:798613, Magenta:974505, Yellow:425226, TABLE-continued Sample Usage Profile Record Black:708775;
123=Coverage-Paper (%)=Cyan:5, Magenta:6, Yellow:3, Black:5;
124=Pixels Printed-Transparency (1K)=Cyan:90392, Magenta:114583, Yellow:50345, Black:320881;
125=Coverage-Transparency (%)=Cyan:16, Magenta:20, Yellow:9, Black:56;
131=Color vs. Black & White (pages)=Color:821, Black & White:156, Blank:3;
132=Pixels Printed-Black & White (1K)=Cyan:0, Magenta:0, Yellow:0, Black:85608;
133=Coverage-Black & White (%)=Cyan:0, Magenta:0, Yellow:0, Black:4;
134=Pixels Printed-Color (1K)=Cyan:889005, Magenta:1089088, Yellow:475571, Black:944048;
135=Coverage-Color (%)=Cyan:7, Magenta:8, Yellow:4, Black:8;
141=1-Sided vs. 2-Sided (sheets)=1-Sided:868, 2-Sided:56;
143=Manual Feed Media (sheets)=Paper-Letter:0, Paper-Legal:0, Paper-A4:0, Transparency-Letter:0, Transparency-A4:0, Other:0;
144=Cassette Tray Media (sheets)=Upper-Paper-Letter:0, Upper-Paper-Legal:0, Upper-Paper-A4:0, Upper-Transparency-Letter:41, Upper-Transparency-A4:0, Middle-Paper-Letter:0, Middle-Paper-A4:0, Lower-Paper-Letter:883, Lower-Paper-A4:0;
151=Print Quality (pages)=Fast Color:46, Standard:903, Enhanced:3, High-Resolution/Photo:28;
152=Color Correction (pages)=None:1, Vivid Color:0, Simulate Display:2, SWOP Press:0, Euroscale Press:0, Commercial Press:0, Black and White:0, Raw CMYK:20, Raw RGB:0, Automatic:957, Toyo Press:0, Dai Nippon Press:0, Fuji Press:0, Newsprint:0, Non-PostScript:0, Undefined:0;
161=Sets Printed (pages)=First Set Pages:951, Subsequent Set Pages:19;
162=Jobs By Document Length=0–1:132, 2–4:77, 5–9:14, 10–19:8, 20–29:2, 30–49:4, 50–74:2, 75–99:1, 100–249:0, 250+:0;
163=Jobs By Number of Sets=0–1:233, 2–4:7, 5–9:0, 10–19:0, 20–29:0, 30–49:0, 50–74:0, 75–99:0, 100–249:0, 250+:0;
164=Pages By Document Length=0–1:141, 2–4:233, 5–9:77, 10–19:112, 20–29:48, 30–49:159, 50–74:120, 75–99:80, 100–249:0, 250+:0;
165=Pages By Number of Sets=0–1:940, 2–4:30, 5–9:0, 10–19:0, 20–29:0, 30–49:0, 50–74:0, 75–99:0, 100–249:0, 250+:0;
171=Job Source=Internal:5, EtherTalk:0, Parallel:14, USB:0, FrontPanelJobInput:7, AppSocket:220, FTP:0, LPR:0, Remote Internet Printing:0, TokenTalk:0, PrintServer:0, IPP:3, Other:0;
172=Job Language=PostScript:241, PCL:0, AutoSelect:0, Scanner:0, PDF:0, Other:0;
173=Jobs Collated=No:241, Yes:0;
174=Time Per Job (mins)=0–1:217, 2–3:13, 4–9:10, 10–29:0, 30–59:0, 60+:0;
175=Total Jobs=Printing Jobs:241, Non-Printing Jobs:8;
176=Cancelled Jobs=3;
181=Days Printed=24;
182=Pages Per Day=0–1:7, 2–4:1, 5–9:1, 10–24:2, 25–49:7, 50–99:3, 100–249:3, 250–499:0, 500–999:0, 1000+:0;
183=Power On Count=6;
184=Time On Distribution (hours)=0–1:1, 2–3:0, 4–9:0, 10–23:3, 24–167:0, 168+:1;
185=Days Since Activation=23;
186=Hours Since Last Power On=345;
187=Total Time On (hours)=569;
188=Power Off Page#=0, 0, 3141, 3142, 3366;
189=Power Off Date Log=—, —, Wed Oct 25 15:05:34 2000, Wed Oct 25 15:08:26 2000, Wed Nov 01 17:55:55 2000;
191=Total Warmup Time (hours)=1;
192=Total Offline Time (hours)=0;
193=Total EnergyStar Time (hours)=0;
194=EnergyStar Time Distribution (mins)=0–14:0, 15–29:0, 30–119:0, 120–299:0, 300–599:0, 600+:0;
201=JetStack StandBy Time (hours)=28;
202=JetStack StandBy Time Distribution (mins)=0–14:5, 15–29:0, 30–119:30, 120–299:0, 300–599:0, 600+:0;
203=StandBy Time (hours)=373;
204=StandBy Time Distribution (mins)=0–14:3, 15–29:1, 30–119:3, 120–299:0, 300–599:1, 600+:17;
221=Maintenance Kit Installation Date=Wed Aug 09 07:39:13 2000;
222=Maintenance Kit Remaining (%)=59;
223=MKIC=4354;
224=Maintenance Kit Consumption Rate=Low:0, Medium:0, High:980;
231=Doors Open=Front Cover:6, Exit Cover:0, Top Cover:2;
232=Supplies Replaced=Ink-Low:0, Ink-Empty:0, Maintenance Kit-Low:0, Maintenance Kit-Empty:0, Other:0;
233=Paper Out=Upper Tray:2, Middle Tray:0, Lower Tray:10;
234=Button Presses=328;
235=Feature=Info Button:4, Supplies Info Menu:1, Network Setup Menu:0, Printer Setup Menu:0, Job Defaults Menu:0, Printable Pages Menu:10, Service Pages Menu:0, Support Menu:3, Printer Identification:6, Improve Print Quality?:1, Network Questions?:0, Resolve Paper Jams:0, Service Tools Menu:0, TroubleShoot Jams:0;
237=Printer Status=0, 10, 0, 6, 9, 6, 10, 0, 10, 0, 10, 0, 10, 0, 18;
251=System Reset Count=0;

-continued

Sample Usage Profile Record

252=System Reset Log=0, 0, 0, 0, 0;
253=System Reset Page#=0, 0, 0, 0, 0;
254=System Reset Date Log=—, —, —, —, —;
261=Engine Error Count=0;
262=Engine Error Log=—, —, —, —, —, —, —, —, —, —, —, —, —, —, —;
263=Engine Error Page#=0, 0, 0, 0, 0, 0, 0, 0, 0, 0, 0, 0, 0, 0, 0;
264=Engine Error Date Log=—, —, —, —, —, —, —, —, —, —, —, —, —, —, —;
265=Jam Error Count=10;
266=Jam Error Log=—, —, —, —, —, —, —, —, —, —, 22,705.07, 22,024.01, 22,024.01,
22,024.01, 22,500.00;
267=Jam Error Page#=0, 0, 0, 0, 0, 0, 0, 0, 0, 0, 2164, 2199, 2614, 2826, 3001;
268=Jam Error Date Log=—, —, —, —, —, —, —, —, —, —, Thu Oct 12 11:45:36 2000, Thu Oct
12 13:42:32 2000, Wed Oct 18 12:04:43 2000, Fri Oct 20 09:31:24 2000, Tue Oct 24
18:34:47 2000;
271=PostScript Error Count=0;
272=PostScript Error Log=0, 0, 0, 0, 0;
273=PostScript Error Page#=0, 0, 0, 0, 0;
274=PostScript Error Date Log=—, —, —, —, —;
280=Print Head Auto Clean Source=PowerUp:0, EnergyStar:0;
281=PrintHead Clean Count=Automatic:0, Manual:0;
282=PrintHead Clean Source=—, —, —, —, —, —, —, —, —, —;
283=PrintHead Clean Page#=0, 0, 0, 0, 0, 0, 0, 0, 0, 0;
284=PrintHead Clean Date Log=—, —, —, —, —, —, —, —, —, —;
285=PrintHead Installation Page#=0, 0, 0, 0, 0, 0, 0, 0, 0, 2938;
286=PrintHead Installation Date Log=—, —, —, —, —, —, —, —, —, Mon Oct 23 23:25:59
2000;
287=PrintHead Purge Count=Cold Purge:0, Warm Purge:0, High Voltage Cold Purge:0,
High Voltage Warm Purge:0;
291=Last Jam Location=—, —, —, —, Jam D;
292=Last Jam Media Tray=—, —, —, —, Upper Tray;
293=Last Jam Media=—, —, —, —, Upper-Paper-Letter:;
294=Last Jam Page#=0, 0, 0, 0, 3001;
295=Last Jam Date Log=—, —, —, —, Tue Oct 24 18:35:06 2000;
296=Last Jam Transfix Speed=—, —, —, —, 5IPS;
301=Jam A (Upper Tray)=Upper-Paper-Letter:0, Upper-Paper-Legal:0, Upper-Paper-A4:0,
Upper-Transparency-Letter:0, Upper-Transparency-A4:0;
302=Jam B (Middle/Lower Trays)=Middle-Paper-Letter:0, Middle-Paper-A4:0, Lower-
Paper-Letter:0, Lower-Paper-A4:0;
303=Jam C (Exit Cover)=Paper-Letter:0, Paper-Legal:0, Paper-A4:0, Transparency-
Letter:0, Transparency-A4:0, Other:0;
304=Jam D (Front Cover)=Paper-Letter:1, Paper-Legal:0, Paper-A4:0, Transparency-
Letter:0, Transparency-A4:0, Other:0;
305=Jam E (Exit Tray)=Paper-Letter:0, Paper-Legal:0, Paper-A4:0, Transparency-Letter:0,
Transparency-A4:0, Other:0;
307=Jam Manual Feed=Paper-Letter:0, Paper-Legal:0, Paper-A4:0, Transparency-Letter:0,
Transparency-A4:0, Other:0;
331=JetStack PF Count=7;
332=JetStack PF Hours=267.97;
333=JetStack PF Log=0.00, 0.00, 0.00, 0.00, 0.00, 0.00, 0.00, 0.00, 35.77, 78.21, 14.59,
17.16, 19.02, 83.11, 20.09;
334=JetStack PF Date Log=—, —, —, —, —, —, —, —, Fri Oct 27 15:09:57 2000, Tue Oct 31
09:02:49 2000, Mon Nov 06 09:02:29 2000, Wed Nov 08 09:03:55 2000, Fri Nov 10
09:04:32 2000, Tue Nov 14 09:25:16 2000, Thu Nov 16 09:25:54 2000;
335=JetStack PF Page#=0, 0, 0, 0, 0, 0, 0, 0, 3198, 3243, 3463, 3490, 3591, 3671, 3880;
401=Diagnostic Result #0=ID:23,TS:6,PC:3806,Thu Nov 02
2000,08:21:28,R0:180.0000,R1:180.0000,R2:180.0000,R3:0.0000,R4:180.000;
402=Diagnostic Result #1=ID:23,TS:6,PC:2663,Thu Oct 12
2000,16:32:57,R0:180.0000,R1:180.0000,R2:180.0000,R3:0.0000,R4:180.000;
403=Diagnostic Result #2=ID:23,TS:6,PC:2635,Thu Oct 12
2000,13:42:02,R0:180.0000,R1:180.0000,R2:180.0000,R3:0.0000,R4:180.000;
404=Diagnostic Result #3=ID:23,TS:6,PC:2635,Thu Oct 12
2000,13:39:10,R0:180.0000,R1:180.0000,R2:180.0000,R3:0.0000,R4:180.000;
405=Diagnostic Result #4=—;
406=Diagnostic Result #5=—;
411=WarmUp Mode =Intelligent Ready;
412=Adaptive Data Sun =—, —, —, —, —, —, —, —, —, —, —, —, —, —, —, —, —, —, —, —, —, —, —, —;
413=Adaptive Data Mon =—, —, —, —, —, —, —, —, 2, 2, 2, 2, —, —, 3, 3, 3, 2, 3, ,3, —, —, —, —;
414=Adaptive Data Tue =—, —, —, —, —, —, —, —, —, 2, 2, 3, 2, —, 3, 3, —, —, 1, —, —, —, —, —;
415=Adaptive Data Wed =—, 1, 3, —, —, —, —, —, —, 2, 1, 3, —, 3, —, 3, —, 3, 2, —, —, —, —, —;
416=Adaptive Data Thu =—, —, —, —, —, —, —, —, 2, 3, 3, 3, 2, 2, 3, —, —, 3, —, —, —, —, —, —;
417=Adaptive Data Fri =—, —, —, —, —, —, —, —, —, 3, —, 2, 2, 1, 3, 3, 3, 2, 2, —, —, —, —, —;
418=Adaptive Data Sat =—, —, —, —, —, —, —, —, —, —, —, —, —, —, —, —, —, —, —, —, —, —, —, —;
419=Warmup Setting =Sun :-1, Mon :-1, Tue :-1, Wed :-1, Thu :-1, Fri :-1, Sat :-1;
420=Standby Setting =Sun :-1, Mon :-1, Tue :-1, Wed :-1, Thu :-1, Fri :-1, Sat :-1;
END Usage Profile Report (For User)
1001=Profile Error Count=3;
1002=Profile Error Log=0, 0, 127, 101, 117;

-continued

Sample Usage Profile Record

1003=Profile Error Page#=0, 0, 3001, 3001, 3415;
1011=Page Count Trigger=500;
1012=Time Trigger (hours)=84;
1013=Jam Count Trigger=5;
1021=Polling Interval=2;
1022=Email on First Jam=0;
1023=Restart Count Trigger=5;
1031=Pages From Engine=Usage Profile:970, Total Pages:3908;
1033=Verification State=0xc0;
1034=Recent Coverage Page Setting=1000;
1035=Supplies Replaceable Interval=2, 60;
1036=Total Percent Coverage (pages)=0–9:512, 10–24:303, 25–49:44, 50–99:27, 100–199:94, 200+:0;
END Usage Profile Report The first action upon receipt of the support request 108 at the support server 110 is to validate that the Usage Profile information has been received. Support server 110 has an Oracle based Rules Engine 111 which parses the Usage Profile information into a readily accessible format and stores the information in the Usage Profile database 116 and starts a user session in the Customer Session database 118. The fields of interest from the Usage Profile information for the Session database 118 include serial number of printer 14, model number, Usage Profile timestamp and printer IP address. The user's usage profile data are submitted to the Oracle stored procedure created for the Rules Engine. The Rules Engine parses the Usage Profile data, performs an analysis, and returns an error status, an error message (possibly null), and a record set of solutions. The error status describes the relative success of the analysis and may be one of normal, warning or fatal.

On a normal or warning condition, the Rules Engine will return a record set. The record set contains:

| Column Name | Description |
| --- | --- |
| Status_code | One of three values, see table below |
| error_level | The error level returned by the Rules Engine |
| link_text_id | The Link text for the URL |
| solution_content | The solution URL |
| description | The solution description |
| name | The name of this solution |

Each row in this record set represents one of three conditions. The solution_id table documents those conditions:

| Status Message | Action |
| --- | --- |
| RuleFailure | An error occurred within the Rules Engine while processing rules. - Contact Rules admin |
| Positive | A "dead-ringer" solution was discovered for the user's problem. The user can fix the problem with parts. - Display these first |
| Indeterminate | The solution was uncertain. - Display these next |

If the problem is Positive, and a solution 68 is available within the infoSMART database 124, the solution is sent to the user. If the problem is Positive and the user "needs service", the URL points to a separate template path 66 within the application. The user is prompted for contact information and the service request is assigned for processing by the field service teams if the printer is under warranty or contract. If the service job is billable, the user is directed to contact customer support. In all cases, the exit page updates the session record to capture the end timestamp, the exit route, if the problem was solved, the solution type and the infoSMART ID and key, if any.

The Rules Engine provides mechanisms to tie the information received from a user to the appropriate self-support solution. A function of the Rules Engine is to interface with the support server to deliver a solution to the user via the user's browser. The rules that the Rules Engine relies on are stored in the Rules Engine database 122. These rules are stored in a database for easy addition, modification, and maintenance. As new printers are developed to use PhaserSMART, Rules Administrators must be able to define and add rule sets rapidly and easily.

Each Rule contains header information and a series of comparison statements. The header for the Rule typically defines: a Unique ID for the rule, prioritization rank in comparison to all the other rules, a descriptive name for the rule, and a rule type which defines when the rule should be used (i.e., is the rule looking for a direct symptom/solution correlation, an indirect symptom/solution correlation, or some other information). Each comparison statement typically contains the following items:

Order of execution within the Rule;

Source Data (from the printer diagnostic data or usage profile information or such other information provided) for the comparison (this can be a single field or a range of fields from a selected database, similar to what may be seen when defining a range in a program such as Microsoft Excel);

Comparison Type or Operator (such as for example: <, >, =, contains, count of matches, match location, etc.);

The comparison data or result (this can be fixed value, a data base field, or a set of possibilities, and any of these may be modified by addition or subtraction);

What to do if the comparison is true (go to the next statement, the next Rule, or a specific solution set, or store a variable if the comparison was to identify a data location);

What to do if the comparison is false (go to the next statement, the next Rule or a specific solution set); and Comments section for explaining the purpose of the statement, and making it easier to edit in the future (optional).

A simple rule may look like:
Rule ID: 123456
Prioritization: 3
Name: Current Jam Message
Rule Type: Direct Correlation
Simple Rule statements may include:

| Order | Source | Op | Value | True | False | Comments |
|---|---|---|---|---|---|---|
| 1 | Last parameter, in line 236 (Printer Status) | = | 76, 77, 78, 79 OR 80 | Next Field | Next Rule | Looks to see if the current status message identifies a jam condition |
| 2 | Last parameter, line 266 (Jam Error Log) | = | 22,70 3.05 | Solution A | Next Field | Checks for a match with a particular jam type |
| 3 | Last parameter, line 266 (Jam Error Log) | = | 22,52 2.04 | Solution B | Next Field | Checks for a match with a particular jam type |
| 4 | Last Parameter, line 266 (Jam Error Log) | = | 22,50 8.10 | Solution C | Solution D | Checks for a match with a particular jam type. If none is found, chooses a general solution for any jam. |

The system offers flexibility to perform complex comparisons, but allows easy editing to any specific statement. In addition to the production instance of the Rules Engine Database, there may be a staging instance to test rule modifications. After testing and authorization, these rules may be migrated to the production instance.

The Rules Engine contains a set of Rules stored in Rules Engine database 122 for each printer type. These Rules consist of analysis of combinations of Usage Profile tokens that represent error conditions, or symptoms within a printer. The Rules Engine database 122 associates Rule lines with solution Ids, which reference solutions stored within the infoSMART database 124. The Rules Engine 122 returns a solution list and a status message 68, which is transmitted by the support server 110 to the printer via the web browser. The web application may transmit the solution list and status message in the form of a URL (uniform resource locator), which the user can access via the web browser. The URL directs the user to an infoSMART solution in the infoS-MART data base 124. No solutions returned by the Rules Engine require display of an interactive diagnostic session.

Figure 4:
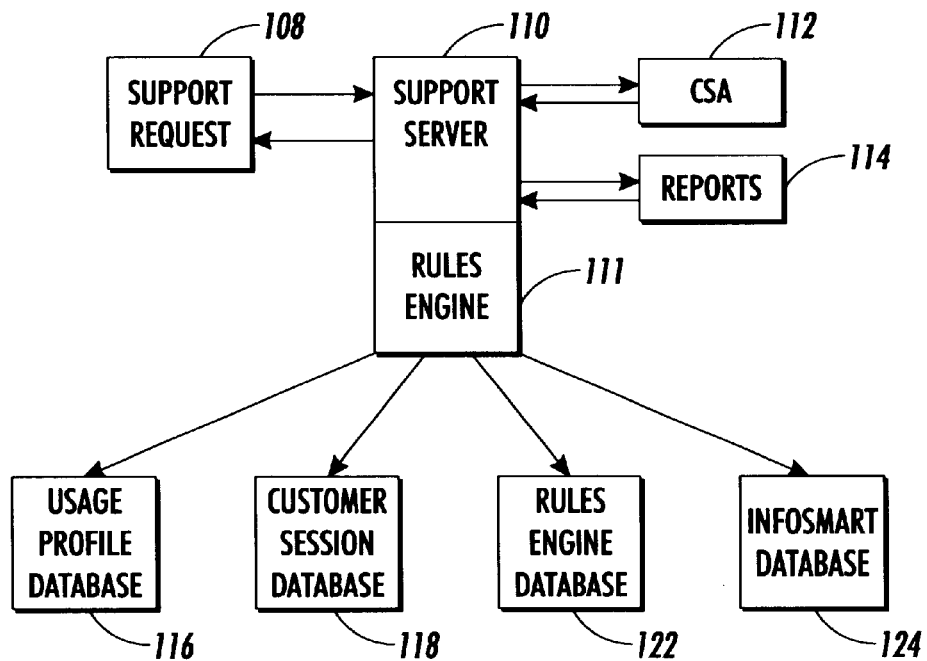
FIG. 4 is another block diagram of an architecture for a support system.
Figure 5:
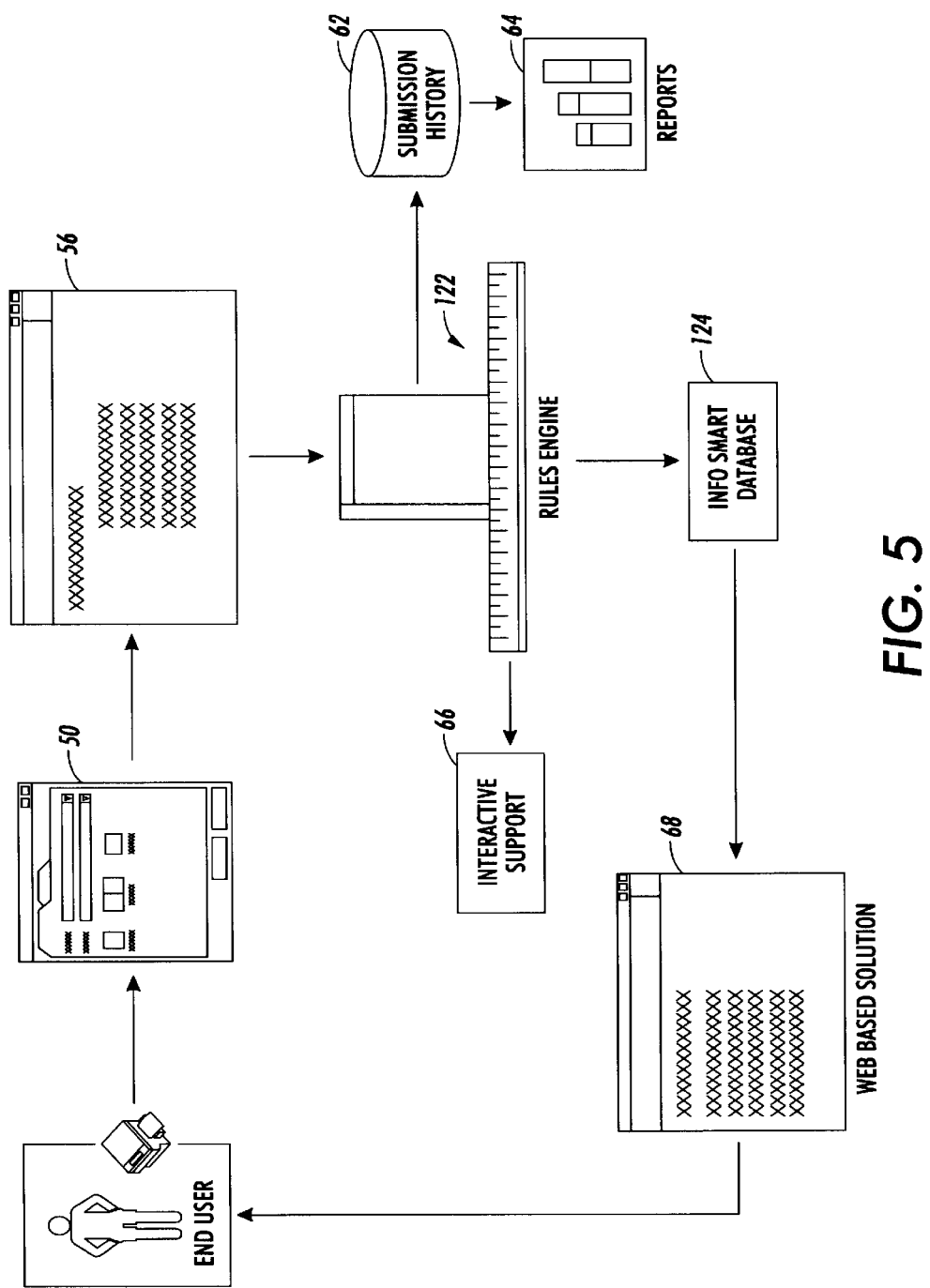
FIG. 5 is another block diagram of an architecture for a service request and result in a support session.

Referring to FIG. 4, an optional web-based Customer Support interface 112 permits call center agents to view user session information and submission history 62. An optional reports module 114 generates reports 64 of service active for administrative and other purposes. Some of these reports may include a record of each discrete activity or event and the calculated proficiency of events (the percentage of events that result in a fix relative to total events). The reports can be used to measure the Rules Engine's sessions solved and sessions which result in a call to the Support Center.

The PhaserSMART system of this embodiment generates four use scenarios. In the first scenario, the user obtains an instant self-support solution. In this case, the information submitted to the Rules Engine contains a "dead ringer." This information is identified by the system and a solution to the identified problem is immediately displayed. The system runs its pattern matching algorithm against the Usage Profile information and system rules. The system finds a high probability solution match. The system finds an associated solution ID in the solution lookup table. The system displays the infoSMART solution 68 on the Rules Engine Resolution page. The user attempts the fix provided by the solution and it is successful. The user clicks an appropriate link on the dialog box 52 to indicate that the problem has been resolved. The system writes the session record including, infoSMART solution ID, resolution status, timestamp.

In the second scenario, the user obtains an interactive self-support solution. In this case, the information submitted to the Rules Engine does not contain a "dead ringer." Further information is needed from the user to diagnose the issue. The system runs its pattern matching algorithm against the Usage Profile information and system rules. The system does not find a match. The system displays a User Choice page with links to interactive diagnostics and other support links. The user chooses the interactive diagnostic link. The system does an analysis of the Usage Profile information to assess where in the infoSMART decision trees to place the user. The system loads the infoSMART decision tree in the main display frame. The user navigates the decision tree, answering questions that narrow the issue to a solution or set of solutions. The system displays the infoSMART solution on a Resolution page. The user attempts the fix provided by the solution. The user clicks the button to indicate that the problem has been resolved. The system writes the session record including, infoSMART solution ID, resolution status, timestamp.

In the third scenario, the end user needs service (a service call from a service representative. In this case, the information submitted to the Rules Engine or the decision tree path leads to a solution that calls for servicing the printer. The system runs its pattern matching algorithm against the Usage Profile information and system rules. The system finds a high probability solution match. The system finds a service needed entry in the solution lookup table. The system displays a page notifying end user of need for service with a "send technician" option. The user clicks yes or no on sending a technician. The system opens a request for a service technician. The system checks for warranty or contract. If not billable, system displays exit page with request ID and assigns the job. If billable, the system displays a Call Choice page. The user chooses to contact a service center or have a service center contact them.

In the fourth scenario, the Customer Support Agent views a user's Rules Engine session. In this case, the user was not able to resolve their issue via the Rules Engine. As a result, they were assigned a Request ID and have called support. The Customer Support Agent needs to access the user's information. The Customer Support Agent takes a call from an PhaserSMART escalation customer. The Customer Support Agent gets the Request ID (RID) from the customer and opens the support session. The Customer Support Agent launches a web browser from a URL, within the OpenUP-TIME system, with RID included. The system queries the PhaserSMART database for the most recent user session. The Customer Support Agent uses the session history and standard troubleshooting techniques to verify problem. The problem is fixed, escalated, or dispatched to field service following standard OPB Customer Support practices. Additional, contingent Use Cases are also possible to implement with the PhaserSMART system.

On completion, the first three scenarios automatically open a service request through a PL/SQL package interface to special interface tables (the OpenUPTIME T_Tables). This integration automates much of the manual information collection into an existing customer support system and automates the routing of requests. This also enables updating of databases. The invention may be used alone or in combination with the methods described in co-pending, co-assigned patent application D/A1151, Printer Diagnostics Method, David Bernklau Halvor, filed the same date as this application, which is incorporated herein by reference. D/A1151 describes a method of diagnosing a printer, where the printer is one of a particular type, includes performing a series of parametric tests on the printer at the time of manufacture to generate a set of baseline values for the printer and storing the baseline results. The baseline results may be stored remotely or with the printer, or both. A set of maximum parametric test variations for the printer type is generated, such that each maximum parametric test variation is associated with a particular printer fault event. At the time of a suspected printer fault, the same parametric tests are performed and a set of suspected fault values generated. The difference between the suspected fault value and the baseline value is calculated for each parametric test. If the difference for a particular parametric test is greater than the maximum parametric test variation for that particular parametric test, the particular print fault event associated with the parametric test value may be indicated. This information could be stored within a separate manufacturing database for access by the Rules Engine in diagnosing printer problems.

Usage Profile database 116 is used to store the Usage Profile information submitted from the user's printer. In addition to PhaserSMART submitted Usage Profile information, this database may also contain the Usage Profile information submitted via email from printers. The Rules Engine 111 first parses the incoming Usage Profile information and then formats it for insertion into the Usage Profile database 116. The Customer Session Database 118 contains the records of the users' interactions with the PhaserSMART system. To provide tracking information, the session database 118 contains a log of any support requests opened and infoSMART session IDs. In addition to tracking information, the database captures any other user input requested by the support server 110. The Rules Engine database 122 provides the location for rules and solution lookup tables. The rules tables relate printers to specific rule sets to match against incoming Usage Profile information. If a match is found, the solution table is queried to determine which infoSMART solution (stored in infoSMART Database 124) should be displayed to the user. The Support Agent interface 112 defines the web screens that the Call Center agents use to interact with Rules Engine and the data sources it touches. The Support Agent screen includes of a list of recent interactions with the support server. Each interaction is represented by a link that shows the session detail when clicked. The screen permits several different ways to sort and filter the list of links that is displayed to the Support Agent. At the top of this screen, a portion may be reserved to display customer information such as model number, serial number, RID, product place notes, and customer notes.

The Report interface 114 allows internal users to measure overall traffic, solution delivery success, and product trending. It matches the serial numbers in against the PhaserSMART session database to determine how many of the PhaserSMART sessions were successful. Predefined or ad hoc reports may be generated.

The Rules Engine 111 parse all incoming user information, such as usage profile information, or data generated as a result of a downloaded printer diagnostics utility. An example of a Rules Engine used in the PhaserSMART system is described below and with reference to FIGS. 6 and 7.

Table 2 is a table of definitions used in the exemplary rule engine.

| Table Definitions | | | | |
|---|---|---|---|---|
| ss_up_interface | | | | create table ss_up_interface ( |
| session_id | NUMBER(15) | NOT NULL | Primary key | session_id NUMBER(15) NOT NULL, |
| token_num | VARCHAR2(10) | NOT NULL | | token_num VARCHAR2(10) NOT NULL, |
| token_desc | VARCHAR2(100) | NOT NULL | | token_desc VARCHAR2(100) NOT NULL, |
| token_payload | VARCHAR2(2000) | | | token_payload VARCHAR2(2000), |
| status | VARCHAR2(20) | NOT NULL | Indicates status of records posted to UP database | status VARCHAR2(20) NOT NULL, |
| created_by | VARCHAR2(20) | NOT NULL | | created_by VARCHAR2(20) NOT NULL, |
| creation_date | DATE | NOT NULL | | creation_date DATE NOT NULL, |
| last_updated_by | VARCHAR2(20) | NOT NULL | | last_updated_by VARCHAR2(20) NOT NULL, |
| last_update_date | DATE | NOT NULL | | last_update_date DATE NOT NULL); |
| ss_lookup_types | | | | kup_types( |
| lookup_type | VARCHAR2(25) | NOT NULL | primary key | lookup_type VARCHAR2(25) NOT NULL, |
| description | VARCHAR2(240) | | | description VARCHAR2(240), |
| created_by | VARCHAR2(20) | NOT NULL | | created_by VARCHAR2(20) NOT NULL, |
| creation_date | DATE | NOT NULL | | creation_date DATE NOT NULL, |
| last_updated_by | VARCHAR2(20) | NOT NULL | | last_updated_by VARCHAR2(20) NOT NULL, |
| last_update_date | DATE | NOT NULL | | last_update_date DATE NOT NULL); |

-continued

| Table Definitions | | | | |
|---|---|---|---|---|
| ss_lookup_codes | | | | create table ss_lookup_codes ( |
| lookup_type | VARCHAR2(25) | NOT NULL | foreign key | lookup_type VARCHAR2(25) NOT NULL, |
| lookup_code | VARCHAR2(25) | NOT NULL | primary key; reflected in program code for logic breaks | lookup_code VARCHAR2(25) NOT NULL, |
| description | VARCHAR2(240) | | | description VARCHAR2(240), |
| active_flag | VARCHAR2(1) | NOT NULL | Can be 'Y' or 'N' | active_flag VARCHAR2(1) NOT NULL, |
| start_date | date | | | |
| end_date | date | | | |
| created_by | VARCHAR2(20) | NOT NULL | | created_by VARCHAR2(20) NOT NULL, |
| creation_date | DATE | NOT NULL | | creation_date DATE NOT NULL, |
| last_updated_by | VARCHAR2(20) | NOT NULL | | last_updated_by VARCHAR2(20) NOT NULL, |
| last_update_date | DATE | NOT NULL | | last_update_date DATE NOT NULL); |
| solutions | | | | create table solutions ( |
| solution_id | NUMBER(15) | NOT NULL | | solution_id NUMBER(15) NOT NULL, |
| name | VARCHAR2(100) | NOT NULL | | name VARCHAR2(100) NOT NULL, |
| status_code | VARCHAR2(25) | NOT NULL | Foreign key: ss_lookup_codes. lookup_code, lookup_type= 'SolutionStatus' | status_code VARCHAR2(25) NOT NULL, |
| error_level | VARCHAR2(25) | NOT NULL | Foreign key: ss_lookup_codes. lookup_code, lookup_type= 'ErrorLevel' | error_level VARCHAR2(25) NOT NULL, |
| link_text_id | NUMBER(15) | | Foreign key | link_text_id NUMBER(15), |
| solution_content | VARCHAR2(240) | NOT NULL | | solution_content VARCHAR2(240) NOT NULL, |
| description | VARCHAR2(240) | | | description VARCHAR2(240), |
| created_by | VARCHAR2(20) | NOT NULL | | created_by VARCHAR2(20) NOT NULL, |
| creation_date | DATE | NOT NULL | | creation_date DATE NOT NULL, |
| last_updated_by | VARCHAR2(20) | NOT NULL | | last_updated_by VARCHAR2(20) NOT NULL, |
| last_update_date | DATE | NOT NULL | | last_update_date DATE NOT NULL); |
| rule_headers | | | | create table rule_headers ( |
| rule_header_id | NUMBER(15) | NOT NULL | Primary Key | rule_header_id NUMBER(15) NOT NULL, |
| name | VARCHAR2(100) | NOT NULL | | name VARCHAR2(100) NOT NULL, |
| symptom | VARCHAR2(240) | | | symptom VARCHAR2(240), |
| description | VARCHAR2(240) | | | description VARCHAR2(240), |
| created_by | VARCHAR2(20) | NOT NULL | | created_by VARCHAR2(20) NOT NULL, |
| creation_date | DATE | NOT NULL | | creation_date DATE NOT NULL, |
| last_updated_by | VARCHAR2(20) | NOT NULL | | last_updated_by VARCHAR2(20) NOT NULL, |
| last_update_date | DATE | NOT NULL | | last_update_date DATE NOT NULL); |
| rule_lines | | | | create table rule_lines ( |
| rule_header_id | NUMBER(15) | NOT NULL | Foreign key: rule_headers.rule_ header_id | rule_header_id NUMBER(15) NOT NULL, |
| rule_line_id | NUMBER(15) | NOT NULL | Primary key | rule_line_id NUMBER(15) NOT NULL, |
| rule_line_num | POSITIVE | NOT NULL | unique rule_line_id, rule_line_num | rule_line_num POSITIVE NOT NULL, |
| description | VARCHAR2(240) | | | description VARCHAR2(240), |
| primary_value_type | VARCHAR2(25) | NOT NULL | Foreign key: ss_lookup_codes. | primary_value_type VARCHAR2(25) NOT NULL, |

-continued

Table Definitions

| | | | | |
|---|---|---|---|---|
| | | | LOOkup_code, lookup_type= 'RuleValueType' | |
| primary_token_num | VARCHAR2(10) | | | primary_token_num VARCHAR2(10), |
| primary_token_name | VARCHAR2(100) | | | primary_token_name VARCHAR2(100), |
| primary_parm_num | BINARY_INTEGER | | for values >= 1: count from first; for values <= −1: count from last; 0 or blank: first parm | primary_parm_num BINARY_INTEGER, |
| primary_payload_key | VARCHAR2(100) | | identify particular name:value pairs in payloads | primary_payload_key VARCHAR2(100), |
| parms_to_search | POSITIVE | | for values >= 1: search through specified number of parameters ; 0 or blank = 1 | parms_to_search POSITIVE, |
| operator | VARCHAR2(25) | NOT NULL | Foreign key: ss_lookup_codes. lookup_code, lookup_type= 'RuleOperator' | operator VARCHAR2(25) NOT NULL, |
| comparison_value | VARCHAR2(240) | | | comparison_value VARCHAR2(240), |
| secondary_value_type | VARCHAR2(25) | NOT NULL | Foreign key: ss_lookup_codes. lookup_code, lookup_type= 'RuleValueType' | secondary_value_type VARCHAR2(25) NOT NULL, |
| secondary_token_num | VARCHAR2(10) | | | secondary_token_num VARCHAR2(10), |
| secondary_token_name | VARCHAR2(100) | | | secondary_token_name VARCHAR2(100), |
| secondary_parm_num | BINARY_INTEGER | | for values >= 1: count from first; for values <= −1: count from last; 0 or blank: first parm | secondary_parm_num BINARY_INTEGER, |
| secondary_payload_key | VARCHAR2(100) | | identify particular name: value pairs in payloads | secondary_payload_key VARCHAR2(100), |
| comparison_units | VARCHAR2(25) | | Foreign key: ss_lookup_codes. lookup_code, lookup_type='Units' | comparison_units VARCHAR2(25), |
| comparison_count | POSITIVE | | Must be >= 1, or NULL | comparison_count POSITIVE, |
| action_true | VARCHAR2(25) | NOT NULL | Foreign key: ss_Lookup_codes. lookup_code, lookup_type= 'RuleAction' | action_true VARCHAR2(25) NOT NULL, |
| target_true | VARCHAR2(20) | | A solution_id, other rule_id rule #, etc., or blank | target_true VARCHAR2(20), |
| description_true | VARCHAR2(240) | | | description_true VARCHAR2(240), |
| action_false | VARCHAR2(25) | NOT NULL | Foreign key: ss_lookup_codes. lookup_code, lookup_type= 'RuleAction' | action_false VARCHAR2(25) NOT NULL, |
| target_false | VARCHAR2(20) | | A solution_id, other rule_id, rule #, etc., or blank | target_false VARCHAR2(20), |
| description_false | VARCHAR2(240) | | | description_false VARCHAR2(240), |
| created_by | NUMBER(15) | NOT NULL | | created_by NUMBER(15) NOT NULL, |
| creation_date | DATE | NOT NULL | | creation_date DATE NOT NULL, |
| last_updated_by | NUMBER(15) | NOT NULL | | last_updated_by NUMBER(15) NOT NULL, |
| last_update_date | DATE | NOT | | last_update_date DATE NOT |

Table Definitions

| | | | | |
|---|---|---|---|---|
| rule_recovery | | NULL | | NULL);<br>create table<br>rule_recovery ( |
| rule_recovery_id | NUMBER(15) | NOT NULL | Primary key | rule_recovery_id<br>NUMBER(15) NOT NULL, |
| rule_header_id | NUMBER(15) | | Foreign key:<br>rule_headers.rule_<br>header_id<br>Note: only header<br>OR line id should be<br>specified, NOT both. | rule_header_id NUMBER(15), |
| rule_line_id | NUMBER(15) | | Foreign key:<br>rule_lines.rule_<br>line_id | rule_line_id NUMBER(15), |
| error_code | VARCHAR2(25) | NOT NULL | Foreign key:<br>ss_lookup_codes.<br>lookup_code,<br>lookup_type=<br>'RuleError' | error_code VARCHAR2(25)<br>NOT NULL, |
| solution_id | NUMBER(15) | NOT NULL | Foreign key:<br>solutions.solution_id | solution_id NUMBER(15)<br>NOT NULL, |
| description | VARCHAR2(240) | | | description VARCHAR2(240), |
| created_by | VARCHAR2(20) | NOT NULL | | created_by VARCHAR2(20)<br>NOT NULL, |
| creation_date | DATE | NOT NULL | | creation_date DATE NOT NULL, |
| last_updated_by | VARCHAR2(20) | NOT NULL | | last_updated_by<br>VARCHAR2(20) NOT NULL, |
| last_update_date | DATE | NOT NULL | | last_update_date DATE NOT NULL); |
| printer_models | | | | create table<br>printer_models ( |
| printer_model_id | NUMBER(15) | NOT NULL | Primary key | printer_model_id<br>NUMBER(15) NOT NULL, |
| model | VARCHAR2(25) | NOT NULL | | model VARCHAR2(25) NOT NULL, |
| description | VARCHAR2(240) | | | description VARCHAR2(240), |
| created_by | VARCHAR2(20) | NOT NULL | | created_by VARCHAR2(20)<br>NOT NULL, |
| creation_date | DATE | NOT NULL | | creation_date DATE NOT NULL, |
| last_updated_by | VARCHAR2(20) | NOT NULL | | last_updated_by<br>VARCHAR2(20) NOT NULL, |
| last_update_date | DATE | NOT NULL | | last_update_date DATE NOT NULL); |
| printers_to_rules | | | unique by<br>printer_type_id,<br>rule id,<br>sequence_num | create table<br>printers_to_rules ( |
| printer_model_id | NUMBER(15) | NOT NULL | Foreign key:<br>printer_models.<br>printer_model_id | printer_model_id<br>NUMBER(15) NOT NULL, |
| rule_header_id | NUMBER(15) | NOT NULL | Foreign key:<br>rule_headers.rule_<br>header_id | rule_header_id NUMBER(15)<br>NOT NULL, |
| sequence_num | POSITIVE | NOT NULL | | sequence_num POSITIVE<br>NOT NULL, |
| active_flag | VARCHAR2(1) | NOT NULL | Can be 'Y' or 'N' | active_flag VARCHAR2(1)<br>NOT NULL, |
| description | VARCHAR2(240) | | | description VARCHAR2(240) |
| created_by | VARCHAR2(20) | NOT NULL | | created_by VARCHAR2(20)<br>NOT NULL, |
| creation_date | DATE | NOT NULL | | creation_date DATE NOT NULL, |
| last_updated_by | VARCHAR2(20) | NOT NULL | | last_updated_by<br>VARCHAR2(20) NOT NULL, |
| last_update_date | DATE | NOT NULL | | last_update_date DATE NOT NULL); |
| link_text | | | | create table<br>link_text ( |
| link_text_id | NUMBER(15) | NOT NULL | primary key | link_text_id NUMBER(15)<br>NOT NULL, |
| link_text | VARCHAR2(100) | NOT NULL | | link_text VARCHAR2(100)<br>NOT NULL, |
| description | VARCHAR2(240) | | | description VARCHAR2(240), |
| created_by | VARCHAR2(20) | NOT NULL | | created_by VARCHAR2(20)<br>NOT NULL, |

-continued

Table Definitions

| | | | |
|---|---|---|---|
| creation_date | DATE | NOT NULL, | creation_date DATE NOT NULL, |
| last_updated_by | VARCHAR2(20) | NOT NULL, | last_updated_by VARCHAR2(20) NOT NULL, |
| last_update_date | DATE | NOT NULL | last_update_date DATE NOT NULL); |
| (NEW) | | | create table (NEW)( |
| created_by | VARCHAR2(20) | NOT NULL, | created_by VARCHAR2(20) NOT NULL, |
| creation_date | DATE | NOT NULL, | creation_date DATE NOT NULL, |
| last_updated_by | VARCHAR2(20) | NOT NULL, | last_updated_by VARCHAR2(20) NOT NULL, |
| last_update_date | DATE | NOT NULL | last_update_date DATE NOT NULL); |

Table 3 shows the data lookup types and codes for the exemplary Rules Engine.

| Data Lookup Type | Description |
|---|---|
| RuleAction | Action types for rules |
| RuleError | Error types when rules don't work as expected |
| RuleOperator | Instructions for comparing usage profile parameters |
| RuleValueType | Instructions for determining what aspects of a UP parameter to evaluate |
| SolutionStatus | Status codes for solutions (returned to calling modules) |
| Units | Measurements (day, month, year, etc.) |
| UPInterface | Status codes for the UP Interface table |
| ErrorLevel | Error codes for solutions, other to help determine how processing should continue. |

| Lookup Type | Lookup Code | Description |
|---|---|---|
| RuleAction | NextLine | Go to next line within same rule |
| RuleAction | NextRule | Go to next rule |
| RuleAction | Solution | Return the Solution |
| RuleAction | SkipToLine | Skip to Rule Line number indicated (within the same rule) |
| RuleAction | SkipToRule | Skip to Rule Header number indicated (for same printer type) |
| RuleAction | RuleStop | Stop processing further rules. |
| RuleAction | | |
| RuleError | LineNotFound | Action was "NextLine", but no more lines available |
| RuleError | RuleNotFound | Action was "NextRule", but no more Rules available |
| RuleError | EvalFailure | Unable to evaluate Usage Profile Parameter(s) |
| RuleError | HeaderLoop | Encountered endless loop through rule headers due to rule misconfiguration |
| RuleError | LineLoop | Encountered endless loop through rule lines due to rule misconfiguration |
| RuleError | TimedOut | Time limit exceeded: possible endless loop or system failure. |
| RuleError | TokenNotFound | A rule line asked for a token number that could not be found in the current UP record |
| RuleError | SolutionNotFound | A rule line asked for a solution_id that doesn't exist in the solutions table. |
| RuleError | | |
| RuleOperator | DateAfter | Date occurs on or after comparison value |
| RuleOperator | DateBefore | Date occurs on or before comparison value |
| RuleOperator | DateBetween | Date occurs between comparison value (list of 2) |
| RuleOperator | DateEquals | Date equals comparison value (to nearest time unit specified) |
| RuleOperator | ItemEquals | String or number equals the comparison value |
| RuleOperator | MatchCount | String or number pattern found multiple times in token payload |
| RuleOperator | NumBetween | Number is between comparison values (list of 2) |
| RuleOperator | NumGreaterThan | Number greater than the comparison value |
| RuleOperator | NumAccumulate | Add the numeric result from this token value to the running total (no comparison with another value yet) |
| RuleOperator | NumLessThan | Number less than the comparison value |
| RuleOperator | TimeBetween | Time interval between comparison value (list of 2, and to nearest time unit specified) |
| RuleOperator | TimeEquals | Time interval equals comparison value (to nearest time unit specified) |
| RuleOperator | TimeGreaterThan | Time interval greater than comparison value (to nearest time unit specified) |
| RuleOperator | TimeLessThan | Time interval less than comparison value (to nearest time unit |

-continued

| | | specified) |
|---|---|---|
| RuleOperator | WithinPayload | Comparison value (string or number) found within the token payload |
| RuleOperator | WithinValue | String or number found within the comparison value (delimited list) |
| RuleOperator | | |
| RuleOperator | | |
| RuleValueType | Constant | A fixed number or text value |
| RuleValueType | NamedValue | Specific token payload value, identified by its key (name portion of the name:value pair) |
| RuleValueType | PayloadSum | The sum of all values from that name:value pairs in a token payload. |
| RuleValueType | TokenValue | A value from the token payload where name:value pairs are not a factor. |
| RuleValueType | RunningTotal | The accumulated sum of several token values gathered in prior rules |
| RuleValueType | Ignore | Ignore this value (used to skip evaluating a primary or secondary value when incrementing the other in a series of rule lines) |
| Units | Seconds | |
| Units | Minutes | |
| Units | Hours | |
| Units | Days | |
| Units | Weeks | |
| Units | Months | |
| Units | Years | |
| Units | | |
| SolutionStatus | Positive | Solution represents certain diagnosis of problem from Usage Profile data. |
| SolutionStatus | Indeterminate | Unable to determine with certainty the nature of the problem from the Usage Profile data. |
| SolutionStatus | RuleFailure | A rule failed, and this solution came from the Rule Recovery table. |
| SolutionStatus | | |
| SolutionStatus | | |
| UPInterface | Error | Error processing for interface |
| UPInterface | Loading | Records are still loading - don't post yet |
| UPInterface | Posted | Records are posted to UP database |
| UPInterface | Purge | Records can be purged |
| UPInterface | Ready | Indicates records are ready to post |
| UPInterface | | |
| ErrorLevel | Normal | Processing ended normally |
| ErrorLevel | Warning | Processing ended with warning-level errors |
| ErrorLevel | Fatal | Processing ended with fatal errors |
| ErrorLevel | | |

Figure 6:
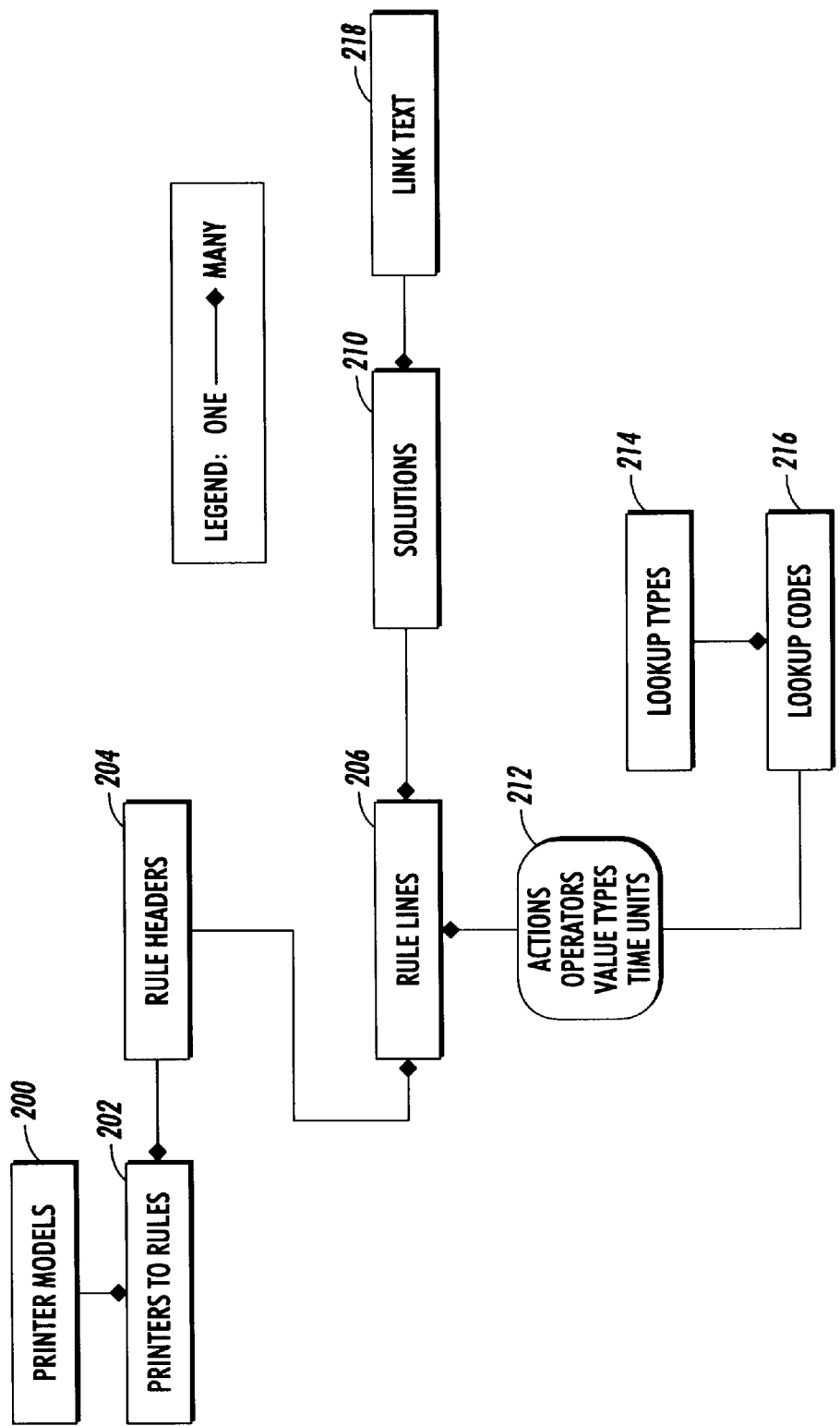
FIG. 6 is a block diagram of the entity relationships between the elements in the rule engine.

Referring to FIG. 6, the relationships between the various entities in the Rules Engine is described. For each printer model 200, there is a list of printer rules 202. Each rule includes a header 204, which is used to access the rule lines 206. Rule lines 206 are operated on by actions, operators, value types and time units 212 reference lookup codes 216 which reference lookup types 214 to generate solutions 210. Solutions 210 reference text link 218.

Figure 7:
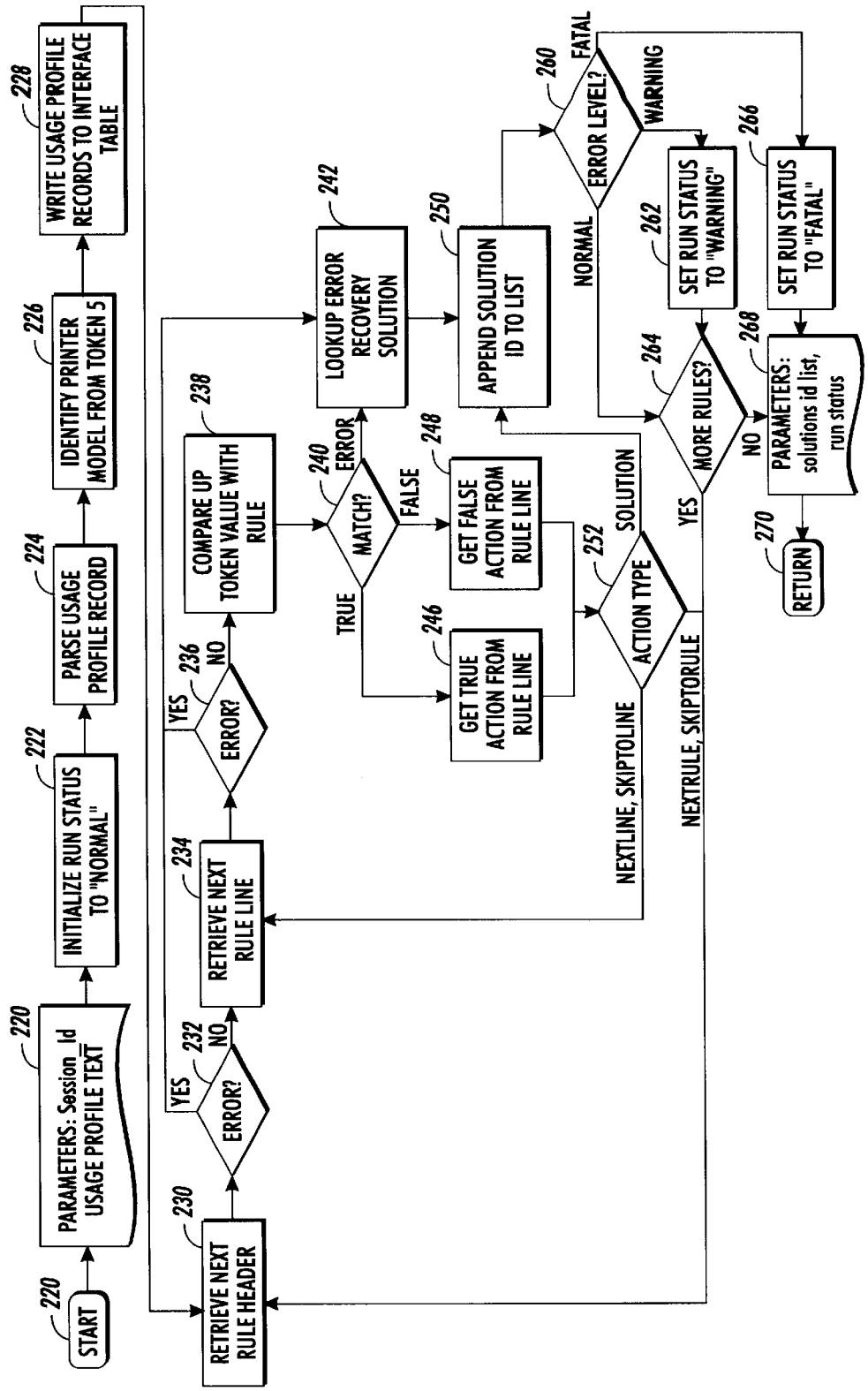
FIG. 7 is a block diagram of the process flow in the rules engine.

The overall process flow of the Rules Engine is shown in FIG. 7. Upon receipt of a support request, the Rules Engine sets up a Session_id and stores the received Usage Profile text in memory (step 220). The run status is initialized to normal (step 222). The Rules Engine then parses the Usage Profile record (such as the one shown in Table 1) into a format shown in Table 3 and stores the tokenized result in Usage Profile database 116 (step 224).

Table 4 shows a the User Profile of Table 1 after it has been parsed into individual components or tokens, a token value or payload assigned to each component and the components stored in the User Profile database 116.

| Token | Token Description | Token Payload |
|---|---|---|
| 1 | Date of Report | Thu Nov 16 17:43:47 2000; |
| 2 | Activation Date | Mon Oct 23 23:25:59 2000; |
| 3 | Printer IDs | Serial #:BCLP356, Ethernet:08:00:11:0F:01:33, IP:13.62.70.236, —:xxxxxx; |
| 4 | Printer Name | Steffen's_BC; |
| 5 | Printer Type | Model:Phaser 860DP, Printer Class:Solid Ink; |
| 6 | Adobe Firmware | 3010.108 (11); |
| 7 | Xerox Firmware | VxWorks:3.18, Engine:14.20, PostScript:14.18, Network:12.48.10.18.2000; |
| 8 | Installed RAM (MBs) | 128; |
| 9 | Installed Trays (incl. Manual) | 3; |
| 10 | Accessories | Duplexer, , ,; |
| 11 | Current Media | Upper Tray:Transparency-Letter, Middle Tray:—, Lower Tray:Paper-Letter, Manual Feed:Other-Other; |
| 101 | Report Intervals | Pages:1000, Hours:168; |
| 111 | Total Pages & | Pages:980, Sheets:924; |

| Token | Token Description | Token Payload |
|---|---|---|
| | Sheets | |
| 112 | Total Pixels Printed (1K) | Cyan:889005, Magenta:1089088, Yellow:475571, Black:1029656; |
| 113 | Average Coverage (%) | Cyan:6, Magenta:7, Yellow:3, Black:8; |
| 114 | Coverage-Last 1000 Pages (%) | Cyan:6, Magenta:7, Yellow:3, Black:8; |
| 115 | Ink Consumed (Sticks) | Cyan:0.90481, Magenta:1.08198, Yellow:0.50879, Black:1.15476; |
| 116 | Pixels Printed Cyan (1K) | Fast Color:10453, Standard:588447, Enhanced:2436, High-Resolution/Photo:287669; |
| 117 | Pixels Printed Magenta (1K) | Fast Color:13880, Standard:651569, Enhanced:3615, High-Resolution/Photo:420024; |
| 118 | Pixels Printed Yellow (1K) | Fast Color:10831, Standard:371417, Enhanced:2694, High-Resolution/Photo:90629; |
| 119 | Pixels Printed Black (1K) | Fast Color:22223, Standard:944578, Enhanced:2454, High-Resolution/Photo:60401; |
| 121 | Paper vs. Transparency (pages) | Paper:939, Transparency:41, Other:0; |
| 122 | Pixels Printed-Paper (1K) | Cyan:798613, Magenta:974505, Yellow:425226, Black:708775; |
| 123 | Coverage-Paper (%) | Cyan:5, Magenta:6, Yellow:3, Black:5; |
| 124 | Pixels Printed-Transparency (1K) | Cyan:90392, Magenta:114583, Yellow:50345, Black:320881; |
| 125 | Coverage-Transparency (%) | Cyan:16, Magenta:20, Yellow:9, Black:56; |
| 131 | Color vs. Black & White (pages) | Color:821, Black & White:156, Blank:3; |
| 132 | Pixels Printed-Black & White (1K) | Cyan:0, Magenta:0, Yellow:0, Black:85608; |
| 133 | Coverage-Black & White (%) | Cyan:0, Magenta:0, Yellow:0, Black:4; |
| 134 | Pixels Printed-Color (1K) | Cyan:889005, Magenta:1089088, Yellow:475571, Black:944048; |
| 135 | Coverage-Color (%) | Cyan:7, Magenta:8, Yellow:4, Black:8; |
| 141 | 1-Sided vs. 2-Sided (sheets) | 1-Sided:868, 2-Sided:56; |
| 143 | Manual Feed Media (sheets) | Paper-Letter:0, Paper-Legal:0, Paper-A4:0, Transparency-Letter:0, Transparency-A4:0, Other:0; |
| 144 | Cassette Tray Media (sheets) | Upper-Paper-Letter:0, Upper-Paper-Legal:0, Upper-Paper-A4:0, Upper-Transparency-Letter:41, Upper-Transparency-A4:0, Middle-Paper-Letter:0, Middle-Paper-A4:0, Lower-Paper-Letter:883, Lower-Paper-A4:0; |
| 151 | Print Quality (pages) | Fast Color:46, Standard:903, Enhanced:3, High-Resolution/Photo:28; |
| 152 | Color Correction (pages) | None:1, Vivid Color:0, Simulate Display:2, SWOP Press:0, Euroscale Press:0, Commercial Press:0, Black and White:0, Raw CMYK:20, Raw RGB:0, Automatic:957, Toyo Press:0, Dai Nippon Press:0, Fuji Press:0, Newsprint:0, Non-PostScript:0, Undefined:0; |
| 161 | Sets Printed (pages) | First Set Pages:951, Subsequent Set Pages:19; |
| 162 | Jobs By Document Length | 0–1:132, 2–4:77, 5–9:14, 10–19:8, 20–29:2, 30–49:4, 50–74:2, 75–99:11 100–249:0, 250+:0; |
| 163 | Jobs By Number of Sets | 0–1:233, 2–4:7, 5–9:0, 10–19:0, 20–29:0, 30–49:0, 50–74:0, 75–99:0, 100–249:0, 250+:0; |
| 164 | Pages By Document Length | 0–1:141, 2–4:233, 5–9:77, 10–19:112, 20–29:48, 30–49:159, 50–74:120, 75–99:80, 100–249:0, 250+:0; |
| 165 | Pages By Number of Sets | 0–1:940, 2–4:30, 5–9:0, 10–19:0, 20–29:0, 30–49:0, 50–74:0, 75–99:0, 100–249:0, 250+:0; |
| 171 | Job Source | Internal:5, EtherTalk:0, Parallel:14, USB:0, FrontPanelJobInput:7, AppSocket:220, FTP:0, LPR:0, Remote Internet Printing:0, TokenTalk:0, PrintServer:0, IPP:3, Other:0; |
| 172 | Job Language | PostScript:241, PCL:0, AutoSelect:0, Scanner:0, PDF:0, Other:0; |
| 173 | Jobs Collated | No:241, Yes:0; |
| 174 | Time Per Job (mins) | 0–1:217, 2–3:13, 4–9:10, 10–29:0, 30–59:0, 60+:0; |
| 175 | Total Jobs | Printing Jobs:241, Non-Printing Jobs:8; |
| 176 | Cancelled Jobs | 3; |
| 181 | Days Printed | 24; |
| 182 | Pages Per Day | 0–1:7, 2–4:1, 5–9:1, 10–24:2, 25–49:7, 50–99:3, 100–249:3, 250–499:0, 500–999:0, 1000+:0; |
| 183 | Power On Count | 6; |
| 184 | Time On Distribution (hours) | 0–1:1, 2–3:0, 4–9:0, 10–23:3, 24–167:0, 168+:1; |
| 185 | Days Since | 23; |

-continued

| Token | Token Description | Token Payload |
|---|---|---|
| 186 | Activation Hours Since Last Power On | 345; |
| 187 | Total Time On (hours) | 569; |
| 188 | Power Off Page# | 0, 0, 3141, 3142, 3366; |
| 189 | Power Off Date Log | —, —, Wed Oct 25 15:05:34 2000, Wed Oct 25 15:08:26 2000, Wed Nov 01 17:55:55 2000; |
| 191 | Total Warmup Time (hours) | 1; |
| 192 | Total Offline Time (hours) | 0; |
| 193 | Total EnergyStar Time (hours) | 0; |
| 194 | EnergyStar Time Distribution (mins) | 0–14:0, 15–29:0, 30–119:0, 120–299:0, 300–599:0, 600+:0; |
| 201 | JetStack StandBy Time (hours) | 28; |
| 202 | JetStack StandBy Time Distribution (mins) | 0–14:5, 15–29:0, 30–119:30, 120–299:0, 300–599:0, 600+:0; |
| 203 | StandBy Time (hours) | 373; |
| 204 | StandBy Time Distribution (mins) | 0–14:3, 15–29:1, 30–119:3, 120–299:0, 300–599:1, 600+:17; |
| 221 | Maintenance Kit Installation Date | Wed Aug 09 07:39:13 2000; |
| 222 | Maintenance Kit Remaining (%) | 59; |
| 223 | MKIC | 4354; |
| 224 | Maintenance Kit Consumption Rate | Low:0, Medium:0, High:980; |
| 231 | Doors Open | Front Cover:6, Exit Cover:0, Top Cover:2; |
| 232 | Supplies Replaced | Ink-Low:0, Ink-Empty:0, Maintenance Kit-Low:0, Maintenance Kit-Empty:0, Other:0; |
| 233 | Paper Out | Upper Tray:2, Middle Tray:0, Lower Tray:10; |
| 234 | Button Presses | 328; |
| 235 | Feature | Info Button:4, Supplies Info Menu:1, Network Setup Menu:0, Printer Setup Menu:0, Job Defaults Menu:0, Printable Pages Menu:10, Service Pages Menu:0, Support Menu:3, Printer Identification:6, Improve Print Quality?:1, Network Questions?:0, Resolve Paper Jams:0, Service Tools Menu:0, TroubleShoot Jams:0; |
| 237 | Printer Status | 0, 10, 0, 6, 9, 6, 10, 0, 10, 0, 10, 0, 10, 0, 18; |
| 251 | System Reset Count | 0; |
| 252 | System Reset Log | 0, 0, 0, 0, 0; |
| 253 | System Reset Page# | 0, 0, 0, 0, 0; |
| 254 | System Reset Date Log | —, —, —, —, —; |
| 261 | Engine Error Count | 0; |
| 262 | Engine Error Log | —, —, —, —, —, —, —, —, —, —, —, —, —, —, —; |
| 263 | Engine Error Page# | 0, 0, 0, 0, 0, 0, 0, 0, 0, 0, 0, 0, 0, 0, 0; |
| 264 | Engine Error Date Log | —, —, —, —, —, —, —, —, —, —, —, —, —, —, —; |
| 265 | Jam Error Count | 10; |
| 266 | Jam Error Log | —, —, —, —, —, —, —, —, —, —, 22,705.07, 22,024.01, 22,024.01, 22,024.01, 22,500.00; |
| 267 | Jam Error Page# | 0, 0, 0, 0, 0, 0, 0, 0, 0, 0, 2164, 2199, 2614, 2826, 3001; |
| 268 | Jam Error Date Log | —, —, —, —, —, —, —, —, —, —, Thu Oct 12 11:45:36 2000, Thu Oct 12 13:42:32 2000, Wed Oct 18 12:04:43 2000, Fri Oct 20 09:31:24 2000, Tue Oct 24 18:34:47 2000; |
| 271 | PostScript Error Count | 0; |
| 272 | PostScript Error Log | 0, 0, 0, 0, 0; |
| 273 | PostScript Error Page# | 0, 0, 0, 0, 0; |
| 274 | PostScript Error Date Log | —, —, —, —, —; |
| 280 | Print Head Auto Clean Source | PowerUp:0, EnergyStar:0; |
| 281 | PrintHead Clean Count | Automatic:0, Manual:0; |
| 282 | PrintHead Clean Source | —, —, —, —, —, —, —, —, —, —; |
| 283 | PrintHead Clean | 0, 0, 0, 0, 0, 0, 0, 0, 0, 0; |

-continued

| Token | Token Description | Token Payload |
|---|---|---|
| 284 | Page# PrintHead Clean Date Log | —, —, —, —, —, —, —, —, —, —; |
| 285 | PrintHead Installation Page# | 0, 0, 0, 0, 0, 0, 0, 0, 0, 2938; |
| 286 | PrintHead Installation Date Log | —, —, —, —, —, —, —, —, —, Mon Oct 23 23:25:59 2000; |
| 287 | PrintHead Purge Count | Cold Purge:0, Warm Purge:0, High Voltage Cold Purge:0, High Voltage Warm Purge:0; |
| 291 | Last Jam Location | —, —, —, —, Jam D; |
| 292 | Last Jam Media Tray | —, —, —, —, Upper Tray; |
| 293 | Last Jam Media | —, —, —, —, Upper-Paper-Letter:; |
| 294 | Last Jam Page# | 0, 0, 0, 0, 3001; |
| 295 | Last Jam Date Log | —, —, —, —, Tue Oct 24 18:35:06 2000; |
| 296 | Last Jam Transfix Speed | —, —, —, —, 5IPS; |
| 301 | Jam A (Upper Tray) | Upper-Paper-Letter:0, Upper-Paper-Legal:0, Upper-Paper-A4:0, Upper-Transparency-Letter:0, Upper-Transparency-A4:0; |
| 302 | Jam B (Middle/Lower Trays) | Middle-Paper-Letter:0, Middle-Paper-A4:0, Lower-Paper-Letter:0, Lower-Paper-A4:0; |
| 303 | Jam C (Exit Cover) | Paper-Letter:0, Paper-Legal:0, Paper-A4:0, Transparency-Letter:0, Transparency-A4:0, Other:0; |
| 304 | Jam D (Front Cover) | Paper-Letter:1, Paper-Legal:0, Paper-A4:0, Transparency-Letter:0, Transparency-A4:0, Other:0; |
| 305 | Jam E (Exit Tray) | Paper-Letter:0, Paper-Legal:0, Paper-A4:0, Transparency-Letter:0, Transparency-A4:0, Other:0; |
| 307 | Jam Manual Feed | Paper-Letter:0, Paper-Legal:0, Paper-A4:0, Transparency-Letter:0, Transparency-A4:0, Other:0; |
| 331 | JetStack PF Count | 7; |
| 332 | JetStack PF Hours | 267.97; |
| 333 | JetStack PF Log | 0.00, 0.00, 0.00, 0.00, 0.00, 0.00, 0.00, 0.00, 35.77, 78.21, 14.59, 17.16, 19.02, 83.11, 20.09; |
| 334 | JetStack PF Date Log | —, —, —, —, —, —, —, —, Fri Oct 27 15:09:57 2000, Tue Oct 31 09:02:49 2000, Mon Nov 06 09:02:29 2000, Wed Nov 08 09:03:55 2000, Fri Nov 10 09:04:32 2000, Tue Nov 14 09:25:16 2000, Thu Nov 16 09:25:54 2000; |
| 335 | JetStack PF Page# | 0, 0, 0, 0, 0, 0, 0, 0, 3198, 3243, 3463, 3490, 3591, 3671, 3880; |
| 401 | Diagnostic Result #0 | ID:23,TS:6,PC:3806,Thu Nov 02 2000,08:21:28,R0:180.0000,R1:180.0000,R2:180.0000,R3 :0.0 000,R4:180.000; |
| 402 | Diagnostic Result #1 | ID:23, TS:6, PC:2663, Thu Oct 12 2000, 16:32:57, R0:180.0000, R1:180.0000, R2:180.0000, R3:0.0 000, R4:180.000; |
| 403 | Diagnostic Result #2 | ID:23, TS:6, PC:2635, Thu Oct 12 2000, 13:42:02, R0:180.0000, R1:180.0000, R2:180.0000, R3:0.0 000, R4:180.000; |
| 404 | Diagnostic Result #3 | ID:23, TS:6, PC:2635, Thu Oct 12 2000, 13:39:10, R0:180.0000, R1:180.0000, R2:180.0000, R3:0.0 000, R4:180.000; |
| 405 | Diagnostic Result #4 | —; |
| 406 | Diagnostic Result #5 | —; |
| 411 | WarmUp Mode | Intelligent Ready; |
| 412 | Adaptive Data Sun | —, —, —, —, —, —, —, —, —, —, —, —, —, —, —, —, —, —, —, —, —, —, —; |
| 413 | Adaptive Data Mon | —, —, —, —, —, —, —, —, —, 2, 2, 2, 2, —, —, 3, 3, 3, 2, 3, 3, —, —, —, —; |
| 414 | Adaptive Data Tue | —, —, —, —, —, —, —, —, —, 2, 2, 3, 2, —, 3, 3, —, —, —, 1, —, —, —, —, —; |
| 415 | Adaptive Data Wed | —, —, —, —, —, —, —, —, —, 2, 1, 3, —, 3, —, 3, —, 3, 2, —, —, —, —, —; |
| 416 | Adaptive Data Thu | —, —, —, —, —, —, —, —, 2, 3, 3, 3, 2, 2, 3, —, —, 3, —, —, —, —, —, —; |
| 417 | Adaptive Data Fri | —, —, —, —, —, —, —, —, —, 3, —, 2, 2, 1, 3, 3, 3, 2, 2, —, —, —, —, —; |
| 418 | Adaptive Data Sat | —, —, —, —, —, —, —, —, —, —, —, —, —, —, —, —, —, —, —, —, —, —, —, —, —; |
| 419 | Warmup Setting | Sun :−1, Mon :−1, Tue :−1, Wed :−1, Thu :−1, Fri :−1, Sat :−1; |
| 420 | Standby Setting | Sun :−1, Mon :−1, Tue :−1, Wed :−1, Thu :−1, Fri :−1, Sat :−1; |
| 1001 | Profile Error Count | 3; |
| 1002 | Profile Error Log | 0, 0, 127, 101, 117; |
| 1003 | Profile Error Page# | 0, 0, 3001, 3001, 3415; |

-continued

| Token | Token Description | Token Payload |
|---|---|---|
| 1011 | Page Count Trigger | 500; |
| 1012 | Time Trigger (hours) | 84; |
| 1013 | Jam Count Trigger | 5; |
| 1021 | Polling Interval | 2; |
| 1022 | Email on First Jam | 0; |
| 1023 | Restart Count Trigger | 5; |
| 1031 | Pages From Engine | Usage Profile:970, Total Pages:3908; |
| 1033 | Verification State | 0xc0; |
| 1034 | Recent Coverage Page Setting | 1000; |
| 1035 | Supplies Replaceable Interval | 2, 60; |
| 1036 | Total Percent Coverage (pages) | 0–9:512, 10–24:303, 25–49:44, 50–99:27, 100–199:94, 200+:0; |

The Rules Engine identifies the model of printer from the value in token 5, which in this case is a Phase Model 860 (step 226). To facilitate operation on the various token values, the usage profile records (table 4) are written to an interface table, stored in memory (step 228). Next, all rules in the rules database are analyzed sequentially, using data from the usage profile record. Each rule is retrieved based on its particular rules header (step 230).

Table 5 lists the Data Rule Headers for the exemplary Rules Engine.

| rule_header_id | name | symptom |
|---|---|---|
| 257 | Currently Cleaning for Light stripes (maybe for Ink Smears, but unlikely) | 28128: Light Stripes - Faded or White Lines or Streaks |
| 258 | Light Stripes in Last 15 Minutes | 28128: Light Stripes - Faded or White Lines or Streaks |
| 259 | Light Stripes in Last 4 Days - Without an automatic dean following it. | 28128: Light Stripes - Faded or White Lines or Streaks |
| 260 | Current Jam Message | Any Jam |
| 261 | Jam in Last 15 Minutes | Any Jam |
| 262 | 3 Jams in Last 4 Days | Any Jam |
| 263 | Ink Use Message and Energy Star or Auto Cleans | 33329: The Printer Consumes more Ink than Anticipated |
| 264 | Frequent Recent Auto Cleans | 33329: The Printer Consumes more Ink than Anticipated |
| 265 | | |
| 266 | Current Fault Code | Any Service Fault |
| 267 | Fault in Last 15 Minutes | Any Service Fault |

-continued

| rule_header_id | name | symptom |
|---|---|---|
| 268 | Fault in Last 4 Days | Any Service Fault |
| 269 | | |
| 270 | Currently Cleaning for Ink Smears | 28297: Marks, Smudges, or Scratches |
| 271 | Recent Cleaning for Ink Smears | 28297: Marks, Smudges, or Scratches |
| 272 | | |
| 273 | Hasn't Used Driver Features | 26085: Cannot get the Printer to do Automatic Duplex or Two-Sided Printing |

Each rule header identifies a particular rule line, which contains the ruler header id, the rule line id, rule line number, value type, token number, token name, parameter number, payload key, parameters to search, operator, comparison value, action true (what to do if the action is true, i.e., go to a solution or the next rule) and action false (go to the next rule or in some cases a solution). Each rule tells the rules engine how to process particular values of user profile information to determine a solution, which is identified by a solution ID. The solution ID will be shown in the action true or action false columns in Table 5. For example, rule header id 266, current fault code, has a symptom of any service fault. Rule 266 in Table 6 has a value type of token, which means a token value from the usage profile data must be obtained. The token number is 262 and the name is engine error log., which has a parametric value of –1. The operator is "itemequals" and the action if true is to escalate to a field call. If false, go to the next line of the rule.

Table 6 lists the rule lines for the exemplary rules engine.

| rule header id | rule line id | rule line num | value type | token num | token name | parm num | pay-load key | parms to search | operator | action true | action false |
|---|---|---|---|---|---|---|---|---|---|---|---|
| 257 | 2046 | 1 | TokenValue | 237 | Printer Status | –1 | | | ItemEquals | NextLine | NextRule |
| 257 | 2047 | 2 | TokenValue | 237 | Printer Status | –3 | | | ItemEquals | NextLine | Solution |
| 257 | 2048 | 3 | TokenValue | 282 | PrintHead Clean Source | –1 | | | ItemEquals | NextLine | NextRule |

-continued

| rule header id | rule line id | rule line num | value type | token num | token name | parm num | pay-load key | parms to search | operator | action true | action false |
|---|---|---|---|---|---|---|---|---|---|---|---|
| 257 | 2049 | 4 | TokenValue | 284 | PrintHead Clean Date Log | −1 | | | TimeLessThan | Solution | NextRule |
| 258 | 2050 | 1 | TokenValue | 282 | PrintHead Clean Source | −1 | | | ItemEquals | NextLine | NextRule |
| 258 | 2051 | 2 | TokenValue | 284 | PrintHead Clean Date Log | −1 | | | TimelessThan | Solution | NextRule |
| 259 | 2052 | 1 | TokenValue | 282 | PrintHead Clean Source | −1 | | | ItemEquals | NextLine | NextRule |
| 259 | 2053 | 2 | TokenValue | 284 | PrintHead Clean Date Log | −1 | | | TimelessThan | Solution | NextRule |
| 259 | 2054 | 3 | TokenValue | 282 | PrintHead Clean Source | −2 | | | ItemEquals | NextLine | NextRule |
| 259 | 2055 | 4 | TokenValue | 284 | PrintHead Clean Date Log | −2 | | | TimelessThan | Solution | NextRule |
| 260 | 2056 | 1 | TokenValue | 237 | Printer Status | −1 | | | WithinValue | Solution | NextRule |
| 260 | 2057 | 2 | TokenValue | 266 | Jam Error Log | −1 | | | ItemEquals | Solution | NextRule |
| 260 | 2058 | 3 | TokenValue | 266 | Jam Error Log | −1 | | | ItemEquals | Solution | NextRule |
| 260 | 2059 | 4 | TokenValue | 266 | Jam Error Log | −1 | | | ItemEquals | Solution | NextRule |
| 260 | 2060 | 5 | TokenValue | 266 | Jam Error Log | −1 | | | ItemEquals | Solution | NextLine |
| 260 | 2061 | 6 | TokenValue | 266 | Jam Error Log | −1 | | | ItemEquals | Solution | NextLine |
| 260 | 2062 | 7 | TokenValue | 266 | Jam Error Log | −1 | | | ItemEquals | Solution | NextLine |
| 260 | 2063 | 8 | TokenValue | 266 | Jam Error Log | −1 | | | ItemEquals | Solution | Solution |
| 261 | 2064 | 1 | TokenValue | 268 | Jam Error DateLog | −1 | | | TimeLessThan | NextLine | NextRule |
| 261 | 2065 | 2 | TokenValue | 266 | Jam Error Log | −1 | | | ItemEquals | Solution | NextLine |
| 261 | 2066 | 3 | TokenValue | 266 | Jam Error Log | −1 | | | ItemEquals | Solution | NextLine |
| 261 | 2067 | 4 | TokenValue | 266 | Jam Error Log | −1 | | | ItemEquals | Solution | NextLine |
| 261 | 2068 | 5 | TokenValue | 266 | Jam Error Log | −1 | | | ItemEquals | Solution | NextLine |
| 261 | 2069 | 6 | TokenValue | 266 | Jam Error Log | −1 | | | ItemEquals | Solution | NextLine |
| 261 | 2070 | 7 | TokenValue | 266 | Jam Error Log | −1 | | | ItemEquals | Solution | NextLine |
| 261 | 2071 | 8 | TokenValue | 266 | Jam Error Log | −1 | | | ItemEquals | Solution | Solution |
| 262 | 2072 | 1 | TokenValue | 268 | Jam Error Date Log | −3 | | | TimeLessThan | NextLine | NextRule |
| 262 | 2073 | 2 | TokenValue | 266 | Jam Error Log | −1 | | | ItemEquals | Solution | NextLine |
| 262 | 2074 | 3 | TokenValue | 266 | Jam Error Log | −1 | | | ItemEquals | Solution | NextLine |
| 262 | 2075 | 4 | TokenValue | 266 | Jam Error Log | −1 | | | ItemEquals | Solution | NextLine |
| 262 | 2076 | 5 | TokenValue | 266 | Jam Error Log | −1 | | | ItemEquals | Solution | NextLine |
| 262 | 2077 | 6 | TokenValue | 266 | Jam Error Log | −1 | | | ItemEquals | Solution | NextLine |
| 262 | 2078 | 7 | TokenValue | 266 | Jam Error Log | −1 | | | ItemEquals | Solution | NextLine |
| 262 | 2079 | 8 | TokenValue | 266 | Jam Error Log | −1 | | | ItemEquals | Solution | Solution |
| 263 | 2080 | 1 | TokenValue | 237 | Printer Status | −1 | | | WithinValue | NextLine | NextRule |
| 263 | 2081 | 2 | TokenValue | 282 | PrintHead Clean | −1 | | 6 | MatchCount | NextLine | NextRule |

-continued

| rule header id | rule line id | rule line num | value type | token num | token name | parm num | pay-load key | parms to search | operator | action true | action false |
|---|---|---|---|---|---|---|---|---|---|---|---|
| 263 | 2082 | 3 | TokenValue | 284 | Source PrintHead Clean Date Log | -3 | | | TimeLessThan | NextLine | NextRule |
| 263 | 2083 | 4 | TokenValue | 284 | PrintHead Clean Date Log | -1 | | | TimeLessThan | NextLine | NextRule |
| 263 | 2084 | 5 | NameValue | 280 | Print Head Auto Clean Source | | Energy Star | | NumGreaterThan | Solution | Solution |
| 264 | 2085 | 1 | TokenValue | 282 | PrintHead Clean Source | -1 | | 6 | MatchCount | NextLine | NextRule |
| 264 | 2086 | 2 | TokenValue | 284 | PrintHead Clean Date Log | -3 | | | TimeLessThan | NextLine | NextRule |
| 264 | 2087 | 3 | TokenValue | 284 | PrintHead Clean Date Log | -1 | | | TimeLessThan | NextLine | NextRule |
| 264 | 2088 | 4 | NamedValue | 280 | Print Head Auto Clean Source | | Energy-Star | | NumGreaterThan | Solution | Solution |
| 265 | 2089 | | | | | | | | | | |
| 266 | 2090 | 1 | TokenValue | 237 | Printer Status | -1 | | | ItemEquals | NextLine | NextRule |
| 266 | 2091 | 2 | TokenValue | 262 | Engine Error Log | -1 | | | ItemEquals | FieldEscalate | NextLine |
| 266 | 2092 | 3 | TokenValue | 262 | Engine Error Log | -1 | | | ItemEquals | FieldEscalate | Solution |
| 267 | 2093 | 1 | TokenValue | 264 | Engine Error Date Log | -1 | | | TimeLessThan | NextLine | NextRule |
| 267 | 2094 | 2 | TokenValue | 262 | Engine Error Log | -1 | | | ItemEquals | FieldEscalate | NextLine |
| 267 | 2095 | 3 | TokenValue | 262 | Engine Error Log | -1 | | | ItemEquals | FieldEscalate | Solution |
| 268 | 2096 | 1 | TokenValue | 264 | Engine Error Date Log | -1 | | | TimeLessThan | NextLine | NextRule |
| 268 | 2097 | 2 | TokenValue | 262 | Engine Error Log | -1 | | | ItemEquals | FieldEscalate | NextLine |
| 268 | 2098 | 3 | TokenValue | 262 | Engine Error Log | -1 | | | ItemEquals | FieldEscalate | Solution |
| 269 | 2099 | | | | | | | | | | |
| 270 | 2100 | 1 | TokenValue | 237 | Printer Status | -1 | | | ItemEquals | NextLine | NextRule |
| 270 | 2101 | 2 | TokenValue | 237 | Printer Status | -3 | | 3 | MatchCount | NextLine | NextRule |
| 270 | 2102 | 3 | TokenValue | 284 | PrintHead Clean Date Log | -1 | | | TimeLessThan | NextRule | Solution |
| 271 | 2103 | 1 | TokenValue | 237 | Printer Status | -1 | | | ItemEquals | NextLine | NextRule |
| 271 | 2104 | 2 | TokenValue | 237 | Printer Status | -3 | | | ItemEquals | NextLine | NextRule |
| 271 | 2105 | 3 | TokenValue | 284 | PrintHead Clean Date Log | -1 | | | TimeLessThan | NextRule | Solution |
| 272 | 2106 | | | | | | | | | | |
| 273 | 2107 | 1 | NamedValue | 151 | Print Quality (pages) | | Fast Color | | NumIncrement | NextLine | NextLine |
| 273 | 2108 | 2 | NamedValue | 151 | Print Quality (pages) | | Enhanced | | NumIncrement | NextLine | NextLine |
| 273 | 2109 | 3 | NamedValue | 151 | Print Quality (pages) | | Photo | | NumIncrement | NextLine | NextLine |
| 273 | 2110 | 4 | RunningTotal | | | | | | NumLessThan | Solution | NextLine |
| 273 | 2111 | 5 | NamedValue | 143 | Manual Feed | | Transparency Letter | | NumIncrement | NextLine | NextLine |

-continued

| rule header id | rule line id | rule line num | value type | token num | token name | pay- parm num | payload key | parms to search | operator | action true | action false |
|---|---|---|---|---|---|---|---|---|---|---|---|
| 273 | 2111 | 6 | NamedValue | 143 | Media (sheets) Manual Feed Media (sheets) | | | Transparency A4 | NumIncrement | NextLine | NextLine |
| 273 | 2111 | 7 | RunningTotal | | | | | | NumGreaterThan | Solution | NextLine |
| 273 | 2112 | 8 | NamedValue | 152 | Color Correction (pages) | | | Automatic | NumLessThan | Solution | NextLine |
| 273 | 2113 | 9 | TokenValue | 10 | Accessories | | | | WithinPayload | NextLine | NextRule |
| 273 | 2114 | 10 | NamedValue | 141 | 1-Sided vs. 2-Sided (sheets) | | | 2-Sided | NumLessThan | Solution | NextRule |

Referring back to FIG. 7, suppose a particular rule returned a solution instead of a next line indication. Table 7 lists the solutions by solution id. Referring to Table 7, and with reference to step 232, the error level in column 4 of table 7 is checked first. The lookup error recovery solution is determined (step 242) and the solution is then appended to the list of information to be sent to the user in response to his service request (step 250). In step 260, the error level is checked to see if it is either normal, warning or fatal. If fatal, the rules engine sets the status to fatal (step 266), and adds the parameters to the solution id list and run status (step 268) and the rule engine analysis ends (step 270). If the solution is normal, the rules engine checks to see if more rules have to be evaluated (step 264). If not, the rules engine adds the parameters to the solution id list and run status (step 268) and the rule engine analysis ends (step 270). If more rules are to be run, it returns to step 230. If the error is a warning, the rules engine sets the run status to warning (step 262) and goes to step 264.

Table 7 Data Solutions

TABLE 7

Data Solution

| solution id | name | status code | error level | description |
|---|---|---|---|---|
| 100 | Default LineNotFound | RuleFailure | Warning | Default solution for rule failure: Line Not Found |
| 101 | Default RuleNotFound | RuleFailure | Warning | Default solution for rule failure: Rule Not Found |
| 102 | Default EvalFailure | RuleFailure | Warning | Default solution for rule failure: Evaluation Failure |
| 103 | Default HeaderLoop | RuleFailure | Fatal | Default solution for rule failure: Header loop |
| 104 | Default LineLoop | RuleFailure | Fatal | Default solution for rule failure: Line loop |
| 105 | Default TimedOut | RuleFailure | Fatal | Default solution for rule failure: Time out |
| 106 | LightStripes Failure | RuleFailure | Warning | Specific solution for light strips rule failure |
| 107 | Critical NextLine Failure | RuleFailure | Fatal | For critical nextline failures |
| 108 | Field Escalate (General) | Positive | Normal | General field escalation solution |
| 109 | Printer jam, general (860): 01 | Positive | Normal | Printer jam solution |
| 110 | Printer jam, general (860): 02 | Indeterminate | Normal | Printer jam solution |
| 111 | Printer jam, general (860): 03 | Positive | Normal | Printer jam solution |
| 112 | Printer jam, general (860): 04 | Indeterminate | Normal | Printer jam solution |
| 113 | Printer jam, general (860): 05 | Indeterminate | Normal | Printer jam solution |

If the result of step 232 indicates there is no error, the rules engine retrieves the next rule line (step 234) and checks for an error at step 236. If yes, it continues to step 242. If not, at step 238, usage profile token value from table 4 is compared with the token value for the rule. The two values are compared in step 240. If the match is true, the true action line from the rule line (step 246) is selected. If the match is false, the false action line from the rule line is selected (step 248). If there is an error in the match, the rules engine goes to step 242. In step 252 the action type is determined. If it is a solution, the rules engine goes to step 250. If it says to go to the next line or skip to a particular line it goes to that line and returns to step 234. If the action type is next rule or skip to rule it goes to step 230.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method of diagnosing a printer problem, comprising:
   providing printer diagnostic data comprising diagnostic data previously generated and stored by the printer during operation of the printer and additional diagnostic data generated by downloading a printer diagnostic utility and executing the diagnostic utility, wherein printer diagnostic data comprises data pertaining to operation of a printer at a time of a printer fault;
   parsing the printer diagnostic data into components; and
   executing a rule comprising:
      comparing each component with a corresponding reference value to generate a comparison result;
      correlating the comparison result with a set of actions including solutions; and
      wherein, if there is a correlation between the comparison result and a solution, identifying the solution.

2. The method of claim 1, where in the correlating step further includes the steps of:
   determining if the comparison is true, wherein if the comparison is true, the set of actions includes going to a next statement in the rule, going to a next rule, going to a specific solution and storing a variable if the comparing step was to identify a data location; and
   determining if the comparison is false, wherein if the comparison is false, the set of actions include going to a next statement, going to a next rule and going to a specific solution.

3. The method of claim 1, wherein the comparing step includes one of less than, greater than, equal to, contains, count of matches, and match location.

4. The method of claim 1, wherein the rule specifies the order of execution of the comparing step.

5. The method of claim 1, further comprising executing a plurality of rules in accordance with a hierarchical order.

6. The method of claim 5, wherein each rule has a unique identifier.

7. The method of claim 5, wherein the plurality of rules comprise a set of rules for a particular printer type.

8. The method of claim 1, wherein the diagnostic data further comprises usage information, wherein the usage information comprises printer operational, usage and status information generated over a period of time.

9. The method of claim 1, wherein the parsing step includes the steps of parsing the printer diagnostic data into components having a particular format and storing the components in a database.

10. The method of claim 1, wherein the solutions represent error conditions or symptoms within a printer.

11. The method of claim 1, wherein if the correlation step results in no solution, farther comprising:
    requesting additional diagnostic data;
    receiving additional diagnostic data;
    parsing the received diagnostic data into components; and
    executing the rule.

* * * * *